US012802320B2

(12) United States Patent
Albin et al.

(10) Patent No.: US 12,802,320 B2
(45) Date of Patent: Nov. 17, 2026

(54) GENERATIVE MODELING OF WHEEL HUB DISPLAY CONTENT

(71) Applicant: Mercedes-Benz Group AG, Stuttgart (DE)

(72) Inventors: Thomas Albin, Stuttgart (DE); Timothy Fenlon, Santa Clara, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 344 days.

(21) Appl. No.: 18/332,300

(22) Filed: Jun. 9, 2023

(65) Prior Publication Data

US 2024/0412437 A1 Dec. 12, 2024

(51) Int. Cl.
*G06T 13/20* (2011.01)
*G06N 3/094* (2023.01)

(52) U.S. Cl.
CPC ............. *G06T 13/20* (2013.01); *G06N 3/094* (2023.01)

(58) Field of Classification Search
CPC .... B60B 7/20; B60B 7/00; B60B 7/06; B60B 7/14; B60R 16/037; B60W 40/10; G06F 16/26; G06N 20/00; G06N 3/045; G06N 3/047; G06N 3/08; G06N 3/088; G06N 3/094; G06T 11/00; G06T 11/60; G06T 13/20; G06T 15/00; G06T 7/00; G06T 7/11; G06T 7/13; G06T 7/70
See application file for complete search history.

(56) References Cited

U.S. PATENT DOCUMENTS 8,096,069 B2 1/2012 Ishikawa et al.
10,636,389 B2 * 4/2020 Gilbert .................. B60K 35/22
11,670,295 B2 * 6/2023 Back ...................... G10L 15/22
704/232
12,033,261 B2 * 7/2024 Villegas ................. G06T 7/215
(Continued)

FOREIGN PATENT DOCUMENTS

CN 110641223 A 1/2020
CN 211493520 U 9/2020
(Continued)

OTHER PUBLICATIONS

U.S. Appl. No. 18/356,820, filed Jul. 21, 2023, 110 pages.
(Continued)

*Primary Examiner* — Said Broome
(74) *Attorney, Agent, or Firm* — Dority & Manning, P.A.

(57) ABSTRACT

Methods, computing systems, and technology for generative modeling of wheel hub display content are presented. A control circuit can: obtain user input data including a description of content to be presented via a display device positioned on a wheel of the vehicle; generate, using one or more models including a machine-learned generative model, the content based on the user input data; receive an output of the one or more models, the output including the generated content; and provide, for presentation via the display device positioned on the wheel of the vehicle, data indicative of the generated content. The machine-learned generative model can be trained to process the user input data and provide generated content that is: (i) based on the description of the content included in the user input data, and (ii) configured for presentation via the display device positioned on the wheel of the vehicle.

18 Claims, 14 Drawing Sheets

(56) References Cited

U.S. PATENT DOCUMENTS

| | | | |
|---|---|---|---|
| 2008/0106140 A1 | 5/2008 | Velez | |
| 2011/0074342 A1 | 3/2011 | MacLaughlin | |
| 2013/0335311 A1 | 12/2013 | Kim | |
| 2014/0204344 A1 | 7/2014 | Harris | |
| 2022/0004809 A1 | 1/2022 | Iyer et al. | |
| 2022/0084204 A1 | 3/2022 | Li et al. | |
| 2023/0350702 A1 | 11/2023 | Wen et al. | |
| 2025/0026144 A1* | 1/2025 | Albin | B60W 40/10 |

FOREIGN PATENT DOCUMENTS

| | | |
|---|---|---|
| DE | 102015007741 A1 | 12/2016 |
| DE | 102018121808 A1 | 3/2019 |
| WO | WO 2022078814 A1 | 4/2022 |

OTHER PUBLICATIONS

Baier et al., “Hybrid physics and deep learning model for interpretable vehicle state prediction”, arXiv preprint arXiv:2103.06727, 9 pages.

* cited by examiner

GENERATIVE MODELING OF WHEEL HUB DISPLAY CONTENT

FIELD

The present disclosure relates generally to generative modeling of wheel hub display content.

BACKGROUND

Generative artificial intelligence is a type of artificial intelligence system capable of generating text, images, or other media in response to prompts. Generative AI systems can be trained over training data to generate new data based on the training data.

SUMMARY

Aspects and advantages of implementations of the present disclosure will be set forth in part in the following description, or may be learned from the description, or may be learned through practice of the implementations.

For example, in an aspect, a computing system may include a control circuit. The control circuit may be configured to obtain user input data including a description of content to be presented via a display device positioned on a wheel of the vehicle. The control circuit may be configured to generate, using one or more models, the content based on the user input data. The one or more models can include a machine-learned generative model. To generate the content, the control circuit may be configured to input the user input data into the machine-learned generative model. The machine-learned generative model can be trained based on training data indicative of a plurality of wheel-based features. The machine-learned generative model may be trained to process the user input data and provide generated content that is: (i) based on the description of the content included in the user input data, and (ii) configured for presentation via the display device positioned on the wheel of the vehicle. The control circuit may be configured to receive an output of the one or more models, the output including the generated content. The control circuit may be configured to provide, for presentation via the display device positioned on the wheel of the vehicle, data indicative of the generated content.

In an embodiment, the generative model is a generative adversarial network trained to provide the generated content based on the user input data.

In an embodiment, at least a portion of the wheel-based features are associated with images depicting at least one of: vehicle wheels, vehicle rims, tires, or hub caps, and at least a portion of the wheel-based features are associated with specifications for at least one of: the vehicle wheels, the vehicle rims, the tires, or the hub caps.

In an embodiment, the specifications are indicative of at least one of: a size, a shape, an associated vehicle model, a year, or a material.

In an embodiment, the training data further includes data indicative at least one of: training images, training icons, training graphics, or training videos.

In an embodiment, the generated content includes at least one of: two-dimensional image content or three-dimensional image content.

In an embodiment, the one or more models include a physics-based model configured to model one or more motion parameters of the vehicle.

In an embodiment, the motion parameters include least one of: a motion of the wheel, a speed of the vehicle, an acceleration of the vehicle, or a heading of the vehicle, In an embodiment, to generate the content, the control circuit is configured to input the motion parameters into the machine-learned generative model.

In an embodiment, the output is based on the motion parameters of the vehicle, the output includes an animation based on the generated content, and the animation includes animated motion of an element based on at least one of: the motion of the wheel, the speed of the vehicle, the acceleration of the vehicle, or the heading of the vehicle.

In an embodiment, the generated content is configured for presentation via the display device positioned on the wheel such that the generated content is formatted and fitted for the display device positioned on the wheel.

In an embodiment, the user input is indicative of a physics event associated with the vehicle and the presentation of the data indicative of the generated content via the display device positioned on the wheel is based on the physics event.

In an embodiment, the user input data is indicative of a timing of display for the generated content, and the output is presented via the display device based on the timing of display indicated by the user input data.

In an embodiment, the user input data is a natural language input provided from a user.

For example, in an aspect, a computer-implemented method can be provided. The method can include obtaining user input data includes a description of content to be presented via a display device positioned on a wheel of the vehicle. The method can include generating, using one or more models, the content based on the user input data. The one or more models can include a machine-learned generative model. Generating the content can include inputting the user input data into the machine-learned generative model. The machine-learned generative model can be trained based on training data indicative of a plurality of wheel-based features. The machine-learned generative model can be trained to process the user input data and provide generated content that is: (i) based on the description of the content included in the user input data, and (ii) configured for presentation via the display device positioned on the wheel of the vehicle. The method can include receiving an output of the one or more models, the output including the generated content. The method can include providing, for presentation via the display device positioned on the wheel of the vehicle, data indicative of the generated content.

In an embodiment, the generative model is a generative adversarial network trained to provide the generated content based on the user input data.

In an embodiment, the generated content includes an image augmented with an icon or a graphic.

In an embodiment, the method further includes processing the output of the one or more models to generate the data indicative of the generated content for presentation via the display device.

In an embodiment, the one or more models includes a physics-based model configured to model one or more motion parameters of the vehicle, the data indicative of the generated content includes an animation based on the generated content, and providing the data indicative of the generated content for presentation via the display device positioned on the wheel of the vehicle includes providing the animation for presentation via the display device such that the animation is presented based on the one or more motion parameters of the vehicle.

For example, in an aspect, one or more non-transitory computer-readable media can store instructions that are executable by a control circuit. The control circuit executing the instructions can obtain user input data including a description of content to be presented via a display device positioned on a wheel of the vehicle. The control circuit executing the instructions can generate, using one or more models, the content based on the user input data. The one or more models can include a machine-learned generative model. To generate the content, the control circuit can be configured to input the user input data into the machine-learned generative model. The machine-learned generative model can be trained based on training data indicative of a plurality of wheel-based features. The machine-learned generative model can be trained to process the user input data and provide generated content that is: (i) based on the description of the content included in the user input data, and (ii) configured for presentation via the display device positioned on the wheel of the vehicle. The control circuit executing the instructions can receive an output of the one or more models, the output including the generated content. The control circuit executing the instructions can provide, for presentation via the display device positioned on the wheel of the vehicle, data indicative of the generated content.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

Figure 1:
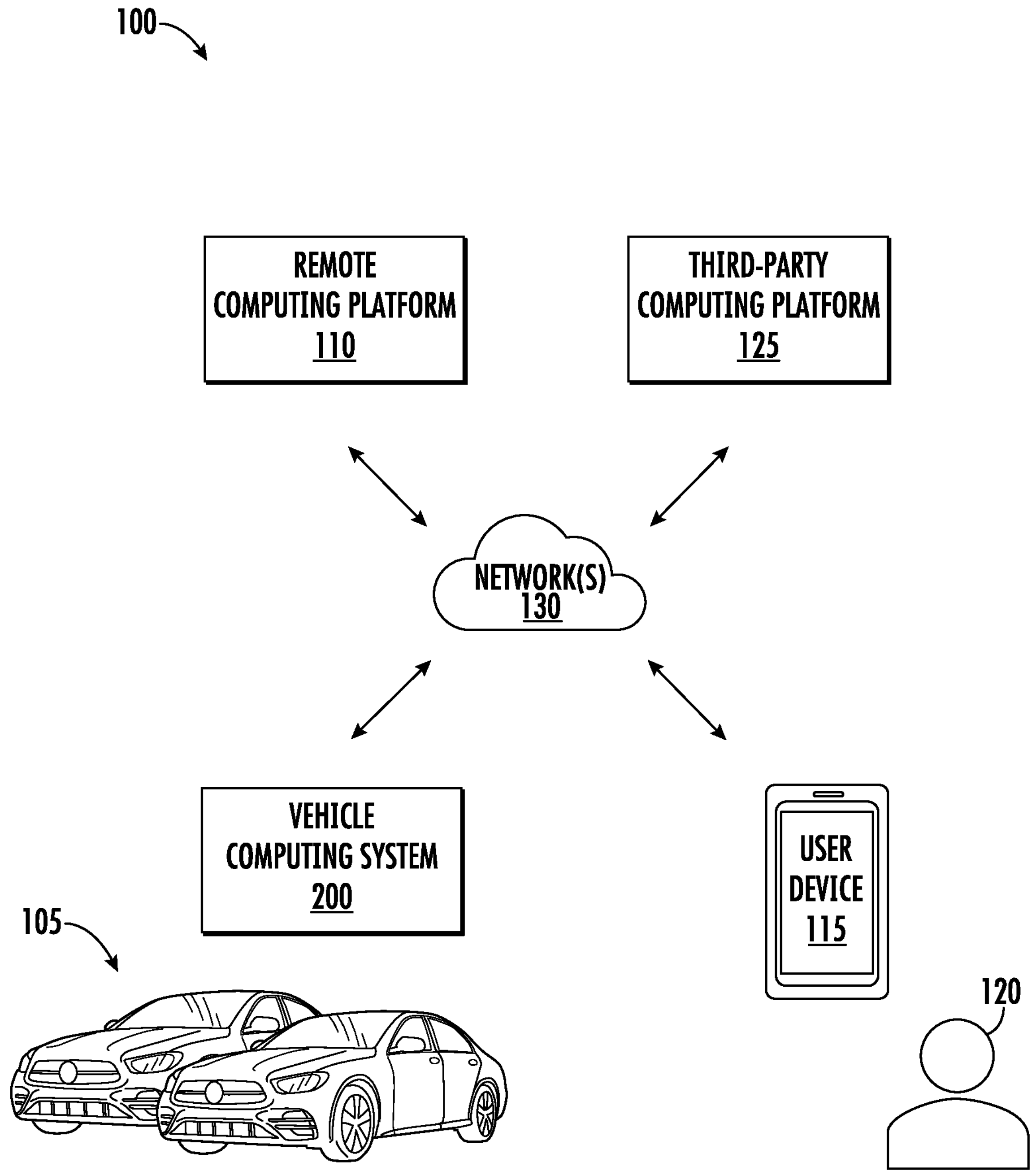
FIG. 1 illustrates an example computing ecosystem according to an embodiment hereof.

Example aspects of the present disclosure are directed to a "smart" wheel hub display and computing system. The wheel hub display can be an integrated (e.g., OEM) component or an after-market consumer electronic device that can be attached to a variety of wheels. One example embodiment of the wheel hub display includes a substantially disk-shaped device with a round display, such as an LED or LCD display. For instance, in one example, the wheel hub display is a high-resolution display (e.g., 1080×1080 display, 4 k display, 8 k display, etc.) with pixels arranged in a circular configuration. Another example embodiment of the wheel hub display includes a three-dimensional display configured to follow at least a portion of the inner hub and spokes of a wheel. The wheel hub display can also include an outer protective layer configured to protect the display from debris, weather conditions, and other elements that could damage the display.

The wheel hub display and associated computing components provide a vehicle operator with the ability to control display elements that provide moving images, icons, and other presentation media. For instance, the wheel hub display can display high quality images, videos, graphic effects, and so on at the wheel of a vehicle. In addition, the wheel hub display can account for various wheel physics and dynamics in rendering the high quality images. For example, the wheel hub display can rotate the displayed image (e.g., with respect to rotational velocity of the wheel) such that the image appears stationary to an observer outside a vehicle as the wheels of the vehicle rotate. As another example, certain effects can be generated with respect to physics of the wheels such that the effects reflect or respond to motion of the vehicle.

In particular, according to example aspects of the present disclosure, a machine-learned generative model can generate content for the wheel hub display based on user input data, such as a user prompt, to customize the wheel display according to the user's preferences. A software application (e.g., on a user device, on a vehicle computing system, etc.) can provide operators of a vehicle with generative tools to design and modify different display effects with wheel hub displays on the wheels of the vehicle. For instance, the application can provide operators of the vehicle with tools to choose what content to display on each wheel hub display, including user-designed content and generated content from a generative model. The generative model can be any suitable generative model, such as a generative adversarial network (GAN), stable diffusion, or other model. An operator of the vehicle can input a description of content to be generated into the application, which then can utilize the generative model (or other models, such as a physics-based model) to generate the content based on the description. The application can then communicate with the wheel hub display(s) to display the generated content.

A remote computing platform can manage training and distribution of the generative models to the vehicles. For instance, the remote computing platform can access or maintain a catalog of wheel-based features, such as wheels, hubs, hub caps, rims, etc. including images, videos, drawings, CAD/CAM, 3D meshes, and other forms of data that can be used to train a machine-learned model. The remote computing platform can also store or access training data corresponding to other effects, such as media (e.g., characters, actors, logos, and so on), physical effects (e.g., fire, bubbles, water, etc.), animals, or other suitable data that an operator may wish to incorporate in some degree into the generated content.

Systems and methods according to example aspects of the present disclosure can provide for a number of technical effects and benefits. For instance, systems and methods according to example aspects of the present disclosure can decrease computational resource usage associated with transmitting and/or storing images for wheel hub displays at a vehicle. The use of a generative model can provide for the generation of new content at the vehicle itself, which can provide for powerful customization options to be made available to the operator of the vehicle without requiring that the vehicle store extensive data to facilitate those customization options. For instance, using a generative model to generate the generated content can avoid computational resource usage associated with storing potentially thousands or hundreds of thousands of pre-generated images while simultaneously increasing customization potential.

The technology of the present disclosure provides a number of computing improvements. This includes improvements to the computing systems onboard vehicles. For example, a vehicle's computing system may be configured to obtain user input data including a description of content to be presented via a display device positioned on a wheel of the vehicle. The computing system may be configured to generate, using one or more models, the content based on the user input data. The one or more models may include a machine-learned generative model. To generate the content, the computing may be configured to input the user input data into the machine-learned generative model. The machine-learned generative model can be trained based on training data indicative of a plurality of wheel-based features. The machine-learned generative model may be trained to process the user input data and provide generated content that is: based on the description of the content included in the user input data, and configured for presentation via the display device positioned on the wheel of the vehicle. The computing system may be configured to receive an output of the one or more models, the output including the generated content. The computing system may be configured to provide, for presentation via the display device positioned on the wheel of the vehicle, data indicative of the generated content. In this way, the computing system of the vehicle may utilize a trained generative model to display different images, graphics, patterns, etc. (rather than a large onboard database), saving a significant amount of memory, which is limited onboard the vehicle. As such, these saved computing resources can be utilized for the vehicle's core functionalities. Additionally, the technology of the present disclosure allows for dynamic and customizable wheel displays without having to physically manipulate the vehicle's wheels, reducing potential mechanical wear and tear.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing system 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a vehicle computing system 200. As described herein, the vehicle computing system 200 that is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
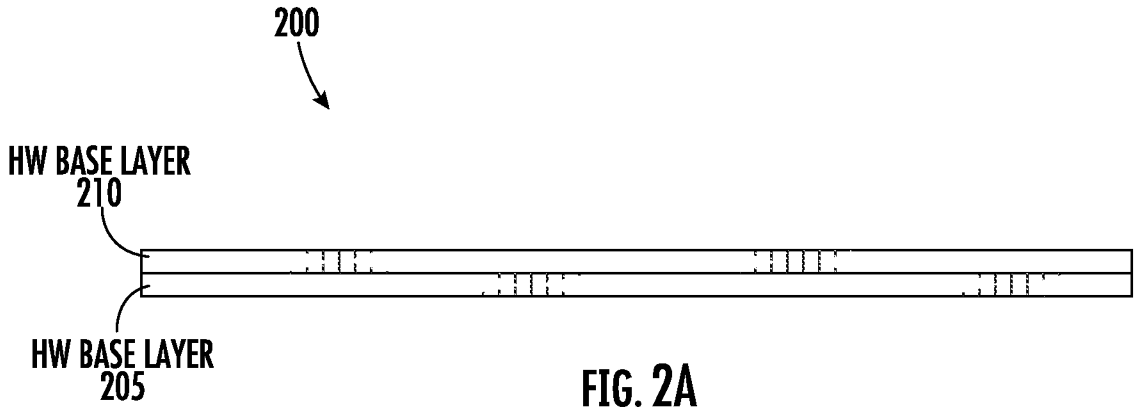
FIGS. 2A-D illustrate diagrams of an example computing architecture for an onboard computing system of a vehicle according to an embodiment hereof.

FIG. 2A illustrates an overview of an operating system of the vehicle computing system 200. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
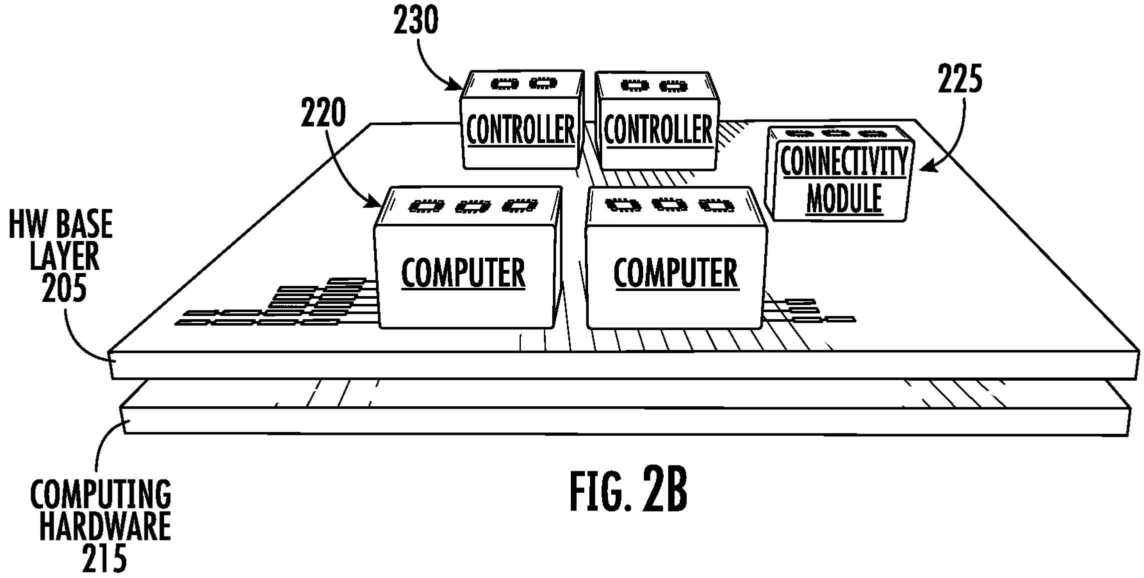

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units 225. The vehicle control units 225 may be configured for controlling various functions of the vehicle 105. This may include, for example, a central exterior and interior controller (CEIC), a charging controller, or other controllers as further described herein.

Figure 2C:
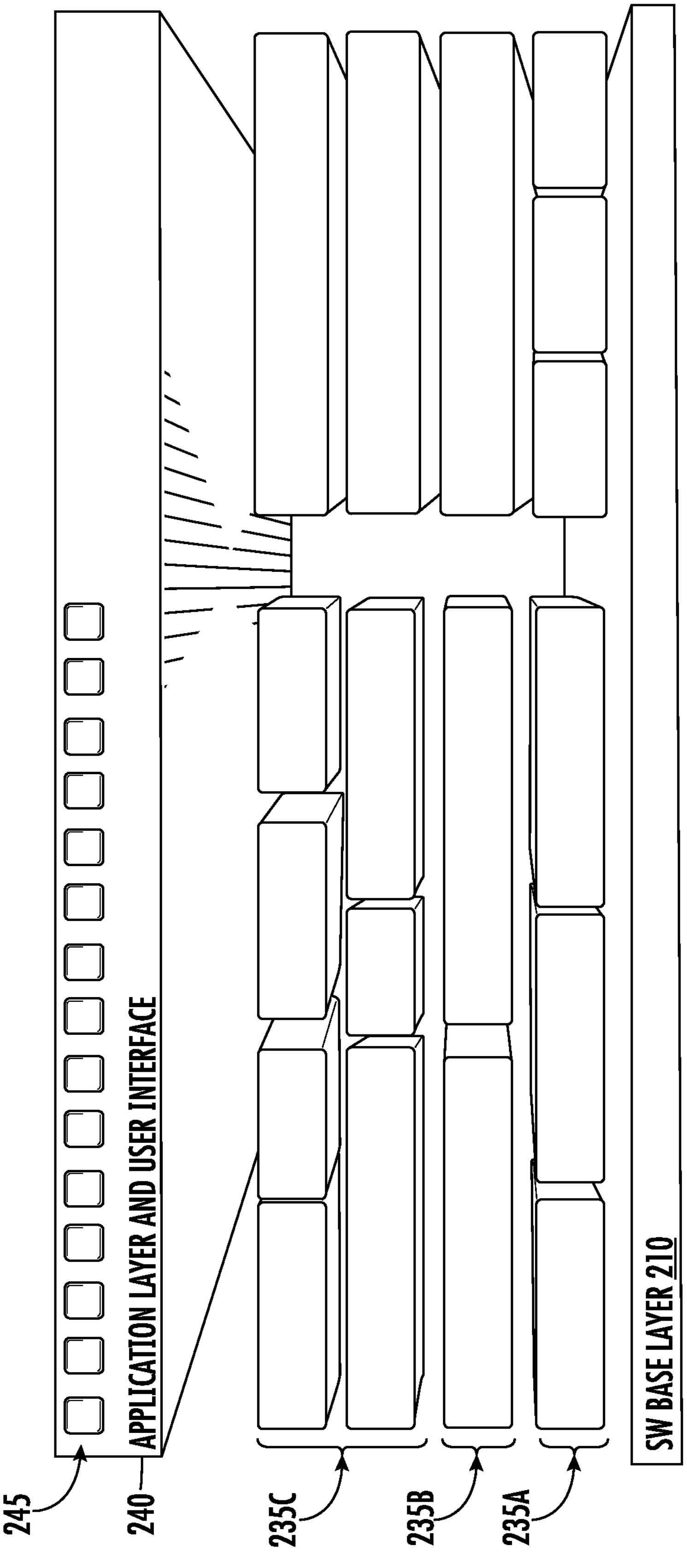

The software layer 205 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-E. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using container interfaces to integrate with applications developed by a variety of different entities.

Figure 2D:
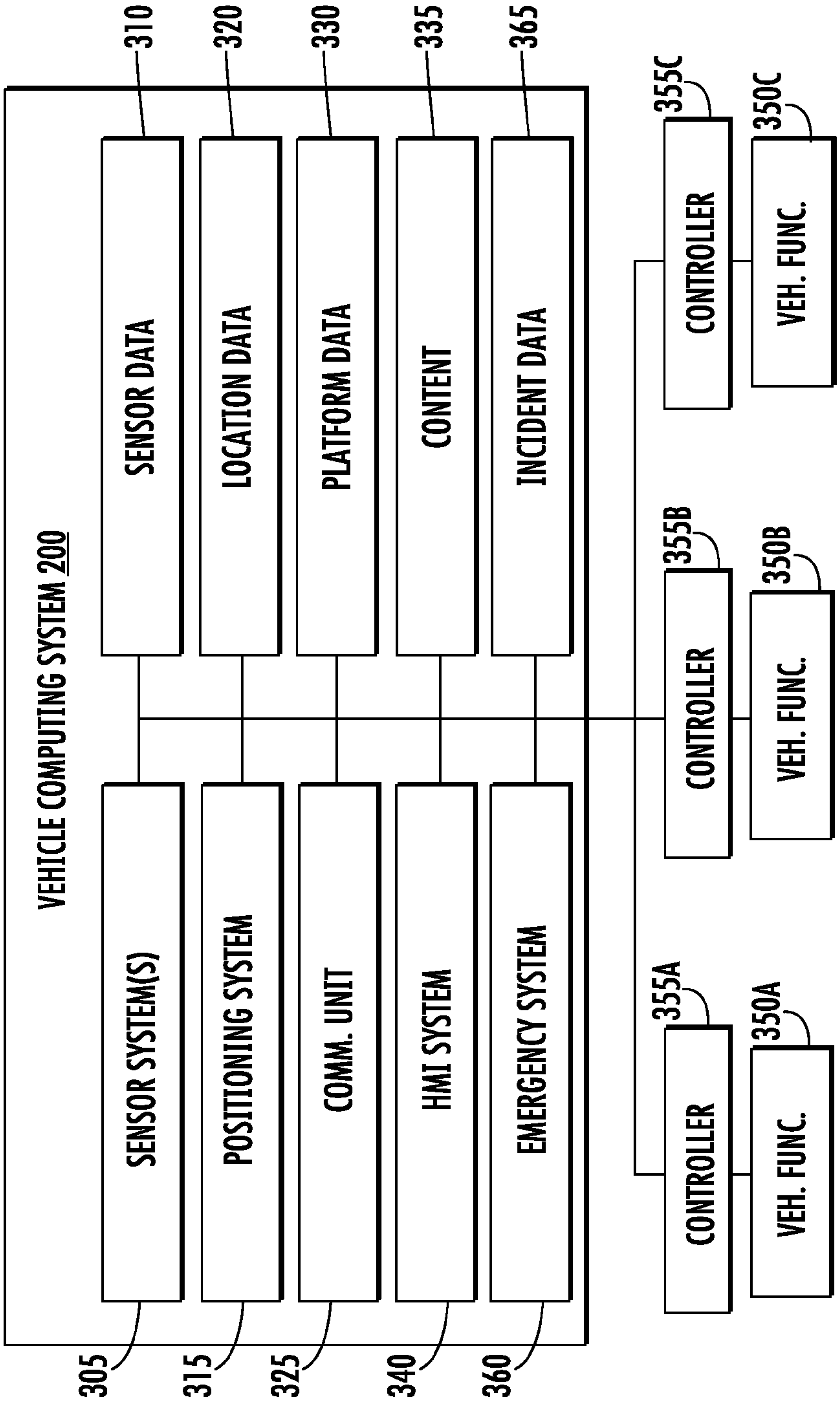

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 305 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, Wi-Fi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the remote computing platform 110 or one or more other remote computing devices over a network 130 (e.g., via one or more wireless signal connections). For example, the vehicle computing system 200 may utilize the communications unit 325 to receive platform data 330 from the computing platform 110. This may include, for example, an over-the-air (OTA) software update for the operating system of the vehicle computing system 200. Additionally, or alternatively, the vehicle computing system 200 may utilize the communications unit 325 to send vehicle data 335 to the computing platform 110. The vehicle data 335 may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communications unit 325 may allow communication among one or more of the systems on-board the vehicle 105. For instance, in some implementations, the communications unit 325 can allow systems on-board the vehicle 105 to communicate with a wheel hub display (not illustrated).

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

Figure 3:
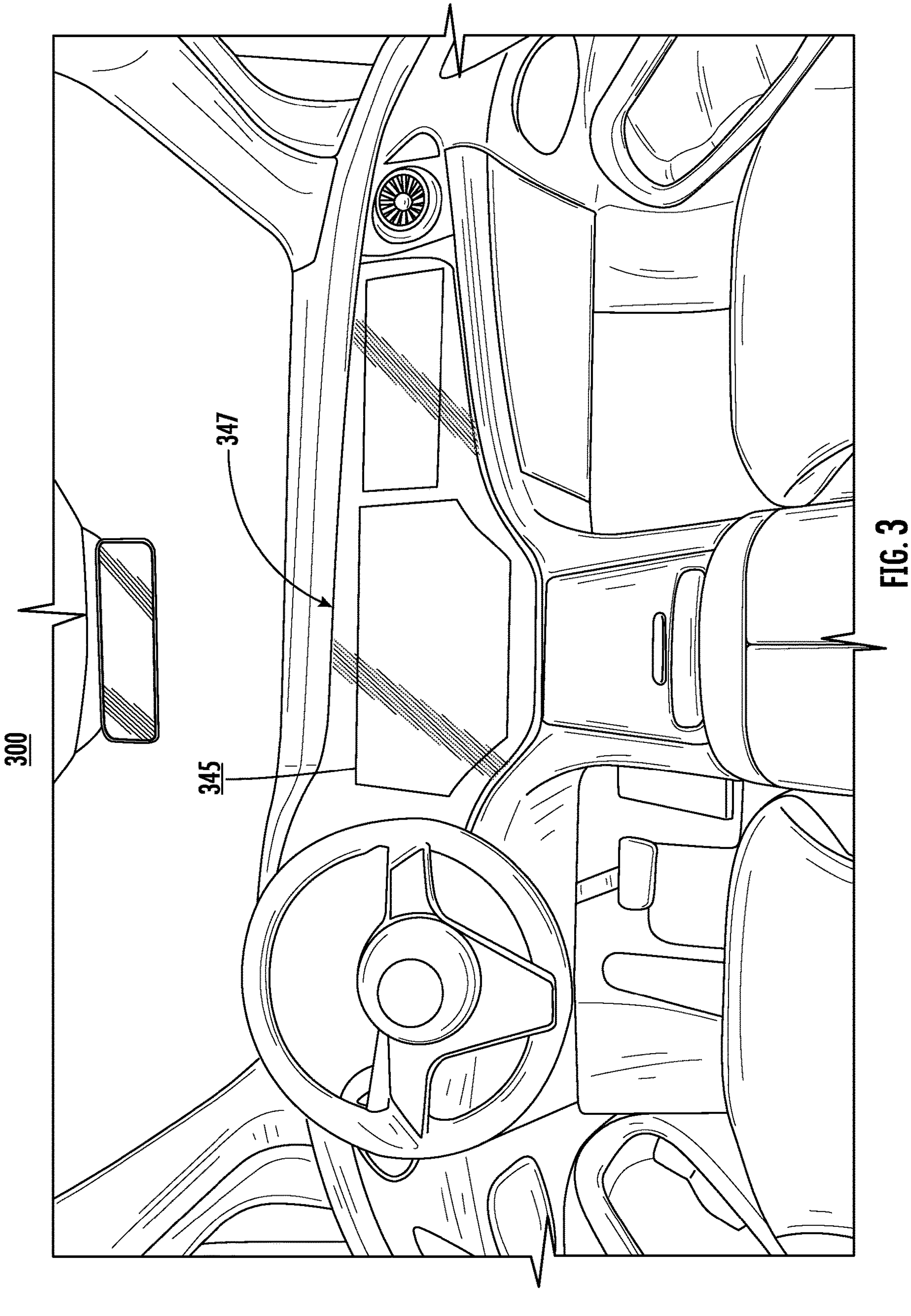
FIG. 3 illustrates an example vehicle interior with an example display according to an embodiment hereof.

FIG. 3 illustrates an example vehicle interior 300 with a display device 345. The display device 345 may be a component of the vehicle's head unit or infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard of the vehicle 105. The display device 345 may include a display screen, CRT, LCD, plasma screen, touch screen, TV, projector, tablet, and/or other suitable display components.

The display device 345 may display a variety of content to the user 120 including information about the vehicle 105, prompts for user input, etc. The display device may include a touchscreen through which the user 120 may provide user input to a user interface. For example, the display device 345 may include user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data 335. The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120. For instance, in some embodiments, the display device 345 may provide the user 120 with controls to gather user input including a description of content to be generated for a wheel hub display.

The vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 250A-C through user input (e.g., to an adjustable input device, UI element) that specifies a setting of the vehicle function 250A-C selected by the user.

Each vehicle function may include a controller 355A-C associated with that particular vehicle function 355A-C. The controller 355A-C for a particular vehicle function may include control circuitry configured to operate its associated vehicle function 355A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be included in vehicle data 335 and transmitted to the computing platform 110.

Figure 4:
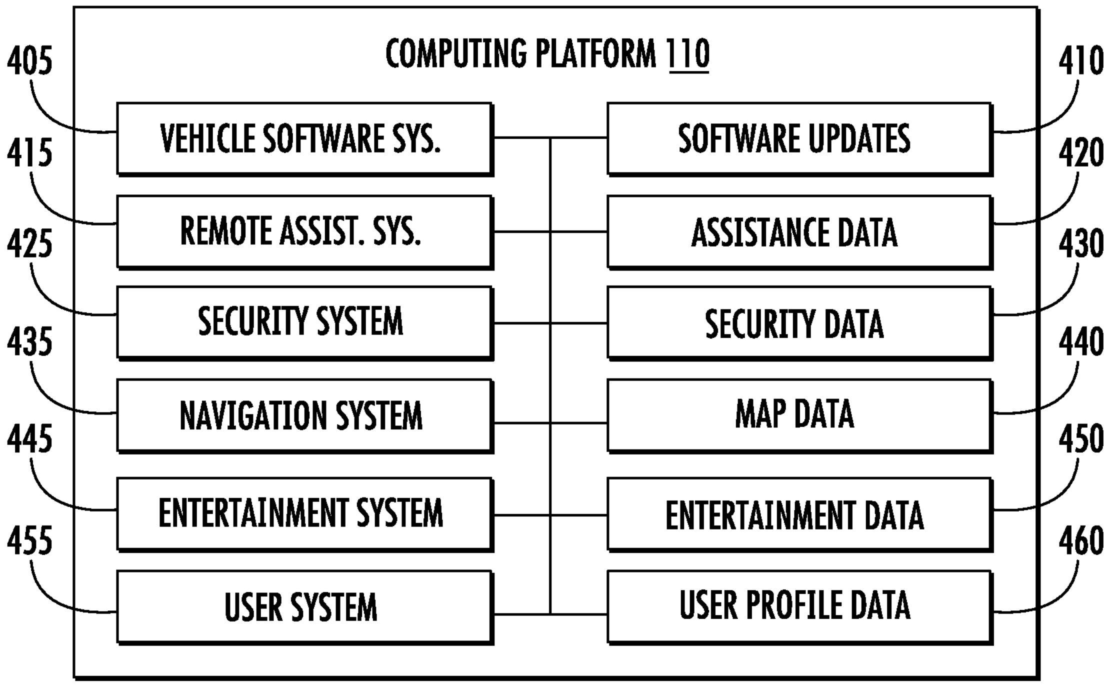
FIG. 4 illustrates a diagram of an example computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform. The computing platform 110 may be implemented on one or more servers and include, or otherwise have access to, one or more databases. In an example, the computing platform 110 may be implemented using different servers based on geographic region.

In some implementations, the computing platform 110 may include layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110.

In an example, the computing platform 110 may include a vehicle software system 405 that is configured to provide the vehicle 105 with one or more software updates 410. The vehicle software system 405 can maintain a data structure (e.g., list, table) that indicates the current software or versions thereof downloaded to a particular vehicle. The vehicle software system 405 may also maintain a data structure indicating software packages or versions that are to be downloaded by the particular vehicle. In some implementations, the vehicle computing system 405 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and updates) for a particular vehicle.

When the vehicle 105 is connected to the computing platform 110 and is available to update its software, the vehicle 105 can request a software update from the computing platform. The computing platform 110 can provide the vehicle 105 one or more software updates 410 as over-the-air software updates via a network 130.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 1110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 120, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. The user profile data 460 may be updated based on information periodically provided by the vehicle 105. In some implementations, the user profile data 460 may be provided to the user device 120.

Figure 5:
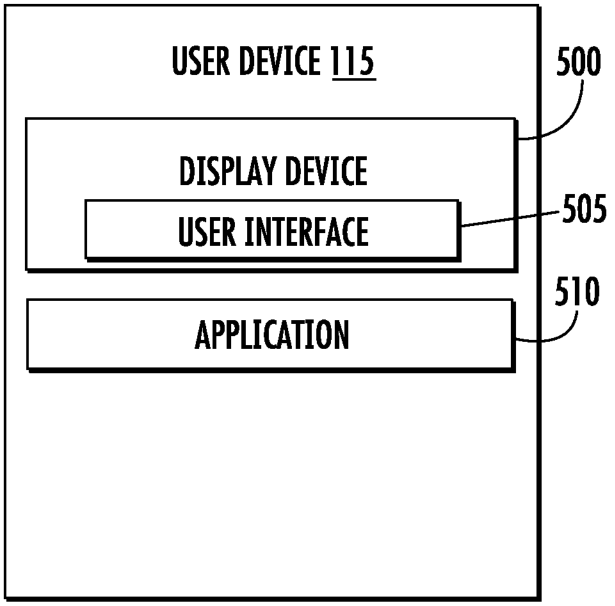
FIG. 5 illustrates a diagram of an example user device according to an embodiment hereof.

FIG. 5 illustrates a diagram of example components of user device 120 according to an embodiment hereof. The user device 120 may include a display device 500 configured to render content via a user interface 505 for presentation to a user 120. The display device 500 may include a display screen, CRT, LCD, plasma screen, touch screen, TV, projector, tablet, or other suitable display components. The user device 120 may include a software application 510 that is downloaded and runs on the user device 120. In some implementations, the software application 510 may be associated with the vehicle 105 or an entity associated with the vehicle 105 (e.g., manufacturer, retailer, maintenance provider). In an example, the software application 510 may enable the user device 120 to communicate with the computing platform 110 and the services thereof.

The technology of the present disclosure allows the vehicle computing system 200 to extend its computing capabilities by generating content for a wheel hub display. In particular, the vehicle computing system 200 can utilize one or more models, including a machine-learned generative model, to generate content for display on the wheel hub display in response to a user input through, for example, user device 120, display device 345, or other suitable input device.

Figure 6A:
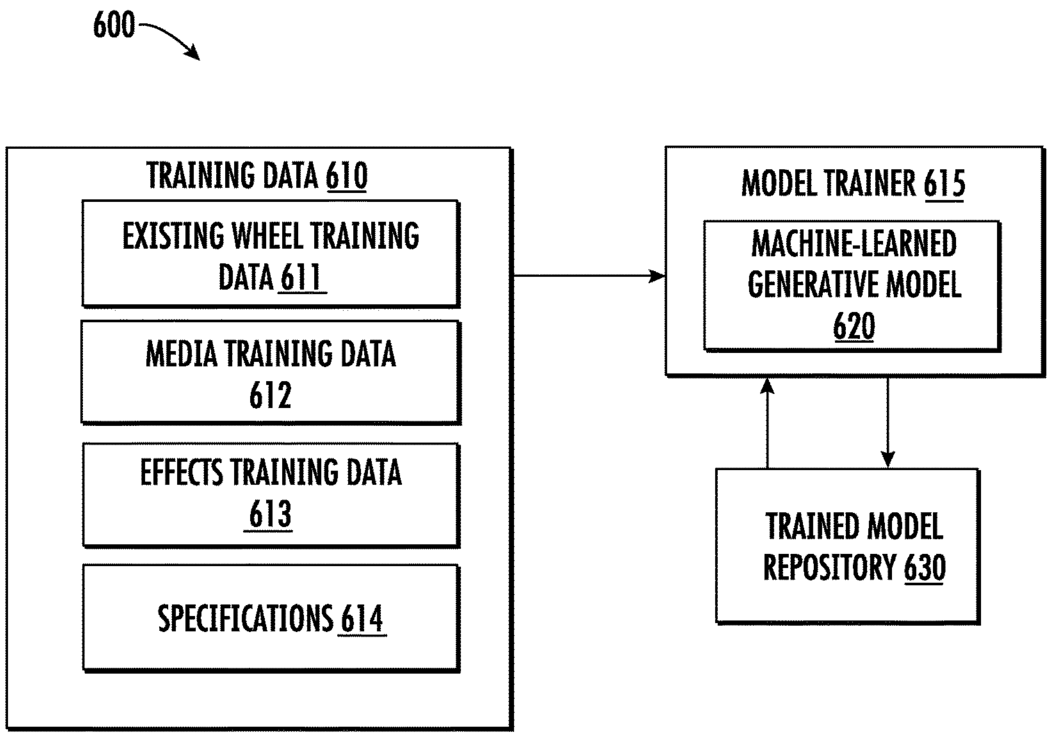
FIGS. 6A-6B illustrate a diagram of example systems for generative modeling of wheel hub display content according to an embodiment hereof.

FIG. 6A illustrates a diagram of an example system 600 for model training for generative modeling of wheel hub display content according to an embodiment hereof. The system 600 includes a model trainer 615 configured to train a machine-learned generative model 620. The model trainer 615 can access a trained model repository 630 to obtain an initial (e.g., pre-trained) machine-learned generative model 620 and/or to store the machine-learned generative model 620 after training. In some implementations, the model trainer 615 can access a pre-trained generative model 620 that is pre-trained for general generative tasks and train the model 620 using the training data 610 to further refine the model 620 for predictions over wheel-based features, such as for generating content for a wheel hub display. The generative model 620 can be any suitable model such as any suitable pre-trained model. As one example, the model 620 may be or may include a generative adversarial network (GAN). As another example, the model 620 may be or may include a stable diffusion model. The stable diffusion model provides for the use of checkpoints and pre-training data, which can contribute to more accurate predictions in some instances. While reference is made to a generative adversarial network (GAN) and a stable diffusion model, these types of models are not intended to be limiting as other types of models (other generative models) may be utilized to implement the technology of the present disclosure.

The model trainer 615 can obtain training data 610. The training data 610 can include any suitable data for training the generative model 620. In particular, the training data 610 can include data indicating a plurality of wheel-based features, such as data indicating wheel rims, hubs, hub caps, spokes, tires, and so on. As examples, the training data 610 can include training images, training models (e.g., 3D models), training videos, training graphics, training icons, and other suitable training data indicative of wheel-based features. The training data 610 can include two-dimensional image content and/or three-dimensional image content. For instance, in some implementations, the training data 610 can be organized into collections or bins. The collections or bins may be indexed by type (e.g., 2D vs. 3D), content type, subject area, etc. In some implementations, the training data 610 can be gathered from open-source data publicly available on the Internet or other data store. Additionally or alternatively, the training data 610 can include proprietary data.

For instance, the training data 610 can include existing wheel training data 611. The existing wheel training data 611 can indicate a plurality of historical or otherwise existing wheels and/or portions thereof, such as rims, spokes, hubs, hub caps, tires, etc. For example, in some implementations, the existing wheel training data 611 can include images, videos, etc. of historical wheel rims labeled with descriptors of wheel rims, such as, for example, an image of a 1950's convertible wheel rim labeled with tags or descriptors such as "1950s," "convertible," "rim," tags describing the make, model, year, and so on to facilitate training the generative model 620. In some implementations, the labels may be automatically generated.

In some implementations, the training data 610 can be used to train styles for the generative model 620. For instance, styles can be generated using keywords, annotated training data, etc. for a specific set of training data. As one example, if the generative model 620 is trained on a specific dataset of 1930's car wheels, the style of that training data can be provided to the generative model 620 as "1930's car wheels" or similar. If a user later wishes to generate content based on that style (e.g., by providing a prompt such as "create wheels that are styled circa 1930's"), the generative model 620 can understand that the user wishes to generate wheels with that style. The styles can also be combined (e.g., by provided a prompt such as "generate a 1930's car wheels with 'Happy Days' characters").

Additionally or alternatively, the training data 610 can include media training data 612. The media training data 612 can include data indicating media such as, for example, characters (e.g., cartoon characters), actors, brands or logos, objects, and other suitable media. The media training data 612 can be labeled with tags or descriptors describing the character, actor, etc. In some implementations, operators of the model trainer 615 can license, purchase, or otherwise access databases provided by owners of the media to obtain the media training data 612.

Additionally or alternatively, the training data 610 can include effects training data 613. The effects training data 613 can indicate a plurality of effects, such as physical effects. As examples, the effects training data 613 can indicate effects such as fire, bubbles, light, colors, water, plants, flags, and other suitable physical effects. The effects training data 613 can be labeled with tags or descriptors indicating the type of effect. Iconic styles such as "gothic," "bubbly," "modern," "baroque," "futuristic," and so on can also be included in effects training data 613.

Additionally or alternatively, the training data 610 can include specifications 614. The specifications 614 can describe aspects of wheels and wheel rims, such as, for example, a size, a shape, an associated vehicle model, a year, or a material associated with a given wheel or wheel rim. For instance, in some implementations, the generated content is configured for presentation via the display device positioned on the wheel such that the generated content is formatted and fitted for the display device positioned on the wheel. The specifications 614 can facilitate formatting and fitting the generated content for presentation via the display device.

In some implementations, after training the model 620 using at least some of the training data 610, the model trainer 615 can store a snapshot or checkpoint based on the training data 610 in the model repository 630. In this way, the model 620 can be trained progressively to evaluate performance over continued training. Once the model 620 is trained to a satisfactory degree, the weights, biases, and other suitable hyperparameters of the model 620 can be stored in the model repository 630.

Although the training data 610 is illustrated as being only for training, it should be understood that the training data can be structured into a training set, validation set, and/or test set in accordance with training regimes. For example, the training data 610 may be partitioned into a training set (e.g., about 80% of the training data 610 or another suitable percentage) for training and adjusting parameters of the generative model 620, a validation set (e.g., about 10% of the training data 610 or another suitable percentage) for fine-tuning hyperparameters and monitoring the model 620's performance during training, and a test set (e.g., about 10% of the training data 610 or another suitable percentage) for evaluating the final performance of the model 620. Furthermore, in some implementations, each dataset can be included in a separate directory with further subdirectories for images and/or masks. This structure can facilitate access and loading of the data during training and evaluation. Any additional metadata associated with the datasets can be stored in a separate file, such as a CSV or JSON file. In some implementations, data augmentation techniques such as random cropping, rotation, scaling, flipping, etc. can increase the diversity of the training data 610.

Figure 6B:
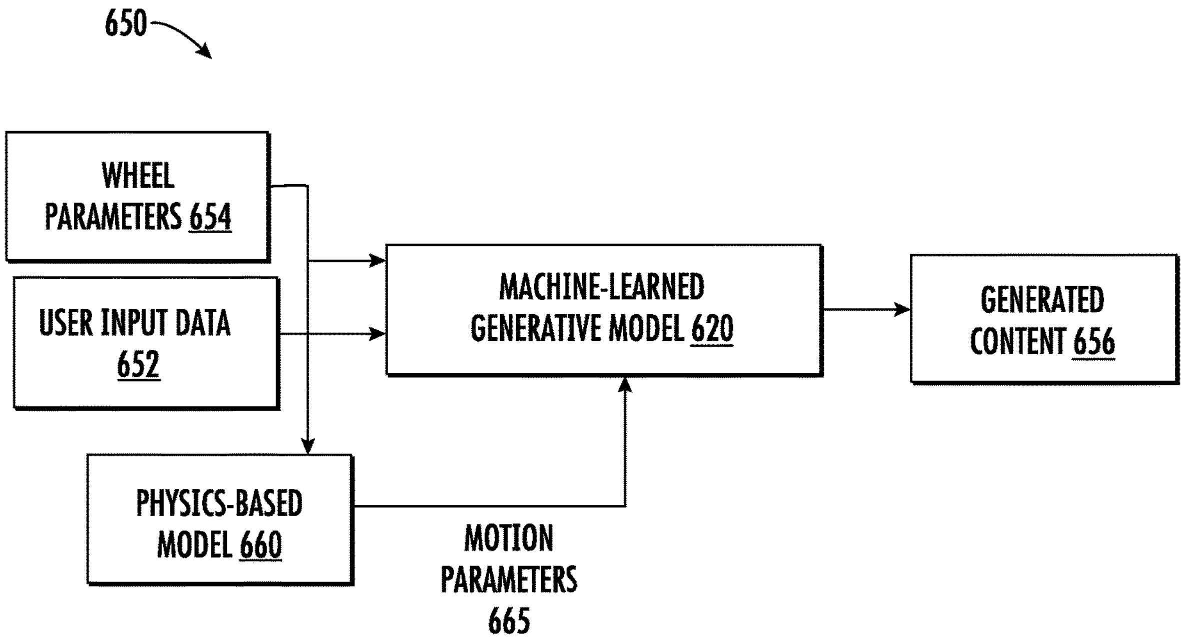

FIG. 6B illustrates a diagram of an example system 650 for generative modeling of wheel hub display content according to an embodiment hereof. The system 650 can employ the generative model 620 of FIG. 6A to produce generated content 656 for display on a wheel hub display. In particular, the system 650 can obtain user input data 652 from a user. The user input 652 can be a natural language input provided from a user (e.g., provide via text or speech input). The user input 652 can include a description of content to be presented via a display device positioned on a wheel of a vehicle. As an example, the user input data 652 can be obtained from an application on a user device, a vehicle infotainment system, or other suitable computing device. In addition to the user input data 652, in some implementations, the generative model 620 can receive wheel parameters 654 describing parameters of the wheel on which the content is to be displayed, such as display type (e.g., 3D, 2D, etc.), display size, wheel type, wheel size, and so on. Based on the user input data 652 and/or the wheel parameters 654, the generative model 620 can produce the generated content 656 for display on the wheel hub display device. In some implementations, for example, the generated content 656 can include an image augmented with an icon or a graphic. The image can be augmented such that the icon/graphic is overlaid, incorporated into, or replaces a portion of the image.

Furthermore, in some implementations, the system 650 can employ a physics-based model 660 to produce generated content 656 that accounts for motion of the wheel on which the generated content 656 is displayed. For instance, the physics-based model 660 can produce motion parameters 665 that model the motion of the vehicle and/or the wheel. As examples, the motion parameters 665 can include a motion of the wheel, a speed of the vehicle, an acceleration of the vehicle, or a heading of the vehicle. To generate the content 656, the system 650 can input the motion parameters 665 into the machine-learned generative model 620. The machine-learned generative model 620 can then produce output (e.g., generated content 656) that is based on the motion parameters 665. As an example, the output can include an animation based on the generated content 656. For instance, the animation can include animated motion of an element in the generated content 656 based on at least one of the motion parameters 665 (e.g., at least one of the motion of the wheel, the speed of the vehicle, the acceleration of the vehicle, or the heading of the vehicle). Additionally, or alternatively, the motion parameters 665 from the physics-based model 650 may be utilized for post-processing the generated content 656, in addition to, or rather than, being used as inputs to the machine-learned generated model 620, as further described herein.

In some implementations, the user input data 652 can be indicative of a physics event associated with the vehicle. The presentation of the data indicative of the generated content 656 via the display device positioned on the wheel can then be based on the physics event. As one example, the user may describe a flame effect that bends backwards when accelerating as if affected by wind from acceleration. To facilitate this effect, the physics-based model 660 can model motion parameters 665 descriptive of acceleration such that the generative model 620 can produce generated content 656 that follows this physics effect. As another example, in some implementations, the user may describe content that flashes red when the vehicle is braking or decelerating, so the physics-based model 660 can produce motion parameters 665 that model vehicle braking or deceleration for the generative model 620.

Furthermore, in some implementations, the user input data 652 can be indicative of a timing of display for the generated content 656. The generated content 656 can be presented via the display device based on the timing of display indicated by the user input data 652. For example, a user may describe a certain generated content 656 that is only displayed at night. The vehicle computing system 200 can thus only display the generated content 656 when it is night. For instance, the timing of display can be compared to current time characteristics to determine whether to display the generated content 656.

In some implementations, the generated content can be post-processed, after output from the machine-learned generative model 620. For example, in some implementations, a post-processing module can be configured to processing the generated content 656 output from the generative model (e.g., one or more generated image frames) and generate an animation based on the motion parameters 665. Thus, the physics-based model 660 (and the motion parameters 660) can be used for post-processing the generated content 656 to create the data that is provided for presentation via the display device positioned on the wheel of the vehicle. Additionally, or alternatively, the post-processing module could generate such data based on the timing of display or the physics event indicated by the user input 652.

By way of example, the machine-learned generative model 620 can generate image frame(s) of a hamster wheel with a superhero inside the hamster wheel. The post-processing module can generate an animation that shows the superhero running and the hamster wheel spinning at the same rate that the tires of the vehicle are rotating. The post-processing module may configure the animation to stop when the vehicle stops and, while the vehicle is stopped, have the superhero stand-still, holding a stop sign. The animation may be configured to continue the display of the superhero running (and the hamster wheel spinning), when the vehicle resumes motion. The post-processing module may provide data indicating the generated content (e.g., the animation) for presentation via the display device positioned on the wheel of the vehicle.

Figure 7:
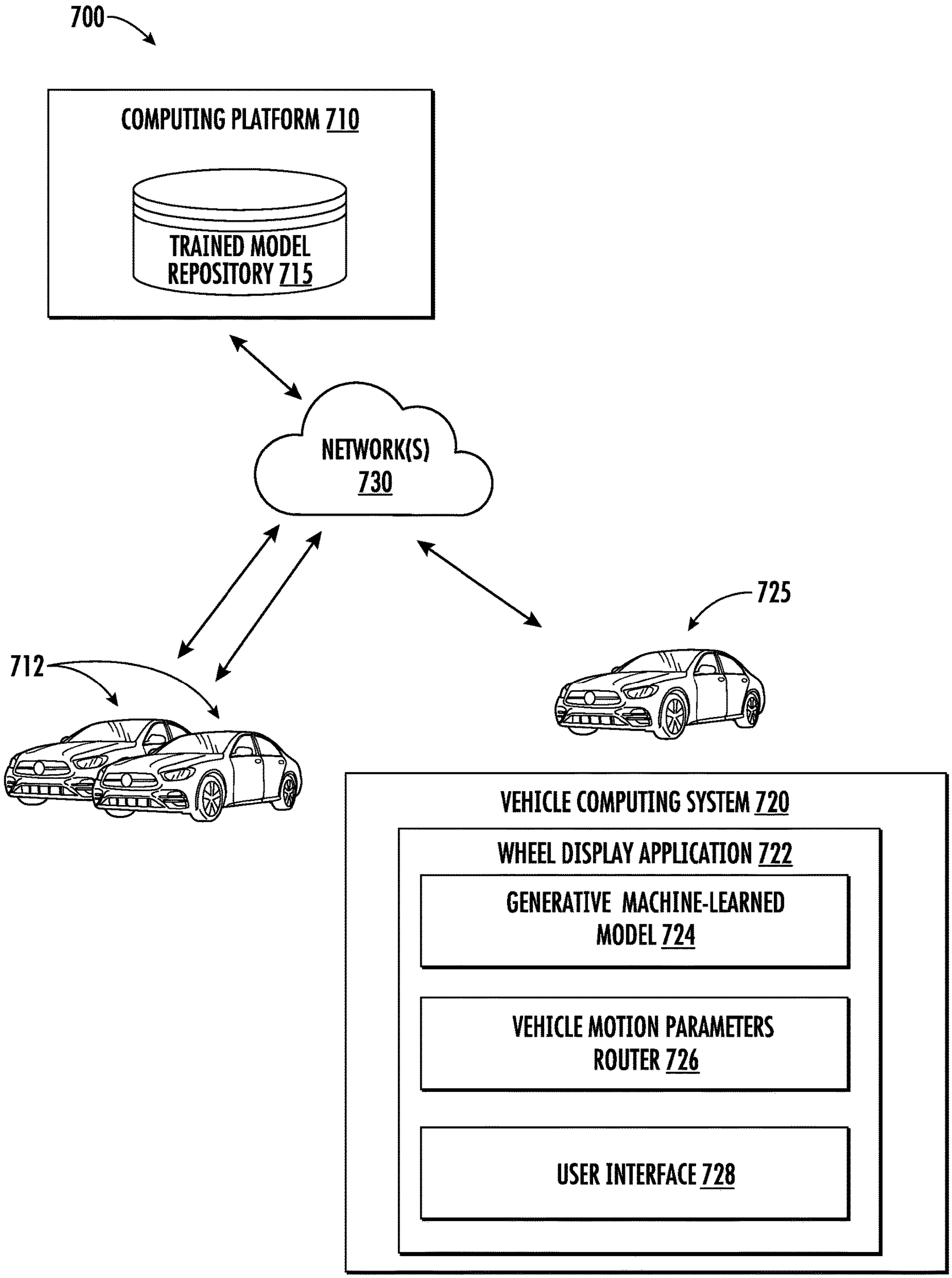
FIG. 7 illustrates a diagram of an example computing ecosystem for generative modeling of wheel hub display content according to an embodiment hereof.

FIG. 7 illustrates a diagram of an example computing ecosystem 700 for generative modeling of wheel hub display content according to an embodiment hereof. A computing platform 710 can include a trained model repository 715. The trained model repository 715 can be configured to store one or more trained machine-learned models, such as machine-learned generative models. For instance, the trained model repository 715 can store a master copy of hyperparameters, such as weights, biases, etc., of machine-learned models. As one example, the trained model repository 715 can be the trained model repository 630 of FIG. 6A.

The computing platform 710 can communicate over one or more networks 730 to provide external computing systems with access to the trained model repository 715. For instance, the computing platform 710 can distribute one or more machine-learned models to one or more vehicles 712. In particular, a vehicle 725 can include a vehicle computing system 720. The vehicle computing system 720 can be, for example, the vehicle computing system 200 of FIG. 1. The vehicle computing system 720 can be configured to perform various computing functions for the vehicle 720, such as, for example, generative modeling of wheel hub display content. In particular, the vehicle computing system 720 can execute or otherwise host a wheel display application 722 configured to control one or more wheel hub displays on vehicle 725. The wheel display application 722 can download or otherwise obtain a machine-learned generative model 724 from the computing platform 710 (e.g., the trained model repository 715).

In addition, the wheel display application can include a vehicle motion parameters router 726. The vehicle motion parameters router 726 can obtain or provide data indicative of motion parameters of the vehicle 725 to the wheel display application 722 such that the wheel display application 722 can utilize the motion parameters at the generative machine-learned model 724. As examples, the vehicle motion parameters router 726 can communicate with sensors onboard the vehicle 725 (e.g., with sensor systems 305) or with other components of vehicle computing system 720 (e.g., with communication system 325) to obtain the vehicle motion parameters.

In addition, the wheel display application can include a user interface 728. The user interface 728 can provide an operator of vehicle 725 with controls for generative modeling of wheel hub display content. Example user interfaces 728 are discussed further with respect to FIGS. 9 and 10.

Figure 8A:
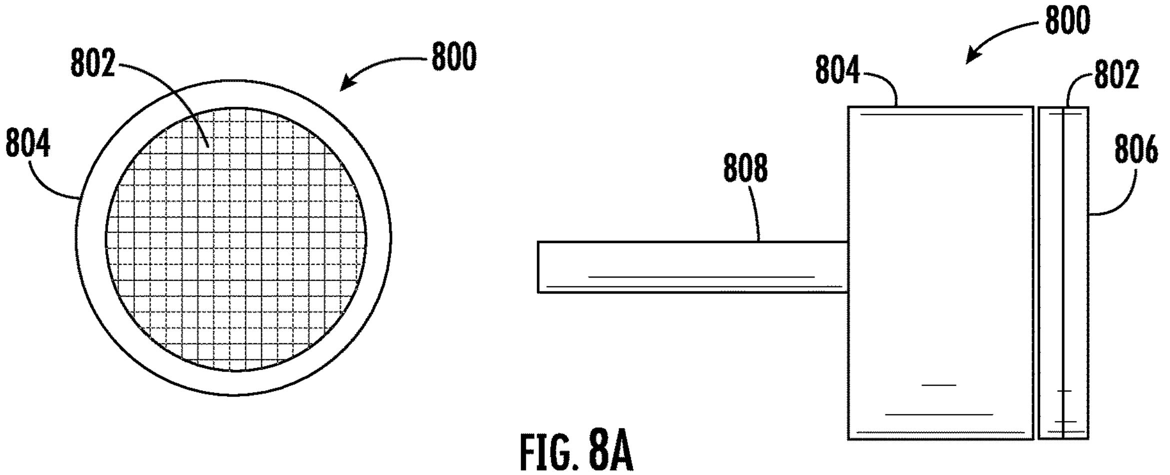
FIGS. 8A-8D illustrate example wheel hub displays according to an embodiment hereof.
Figure 8B:
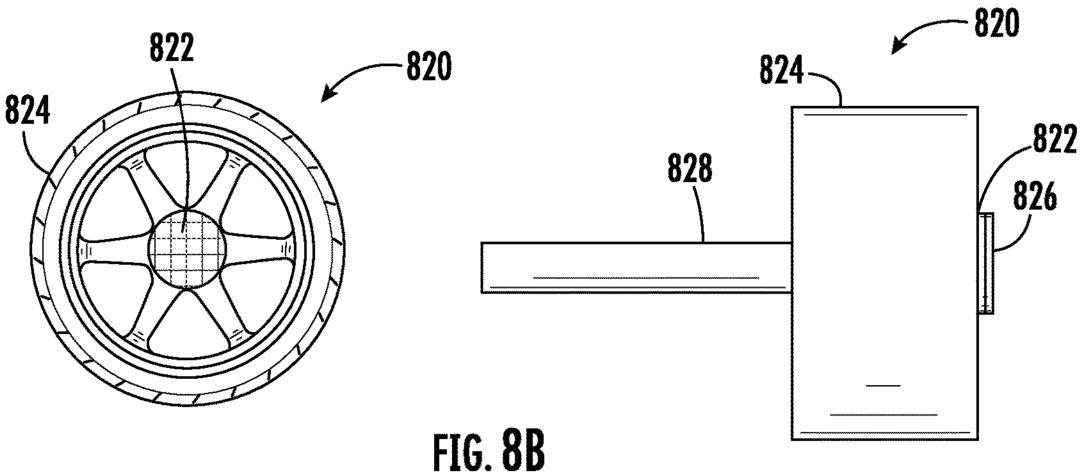
Figure 8C:
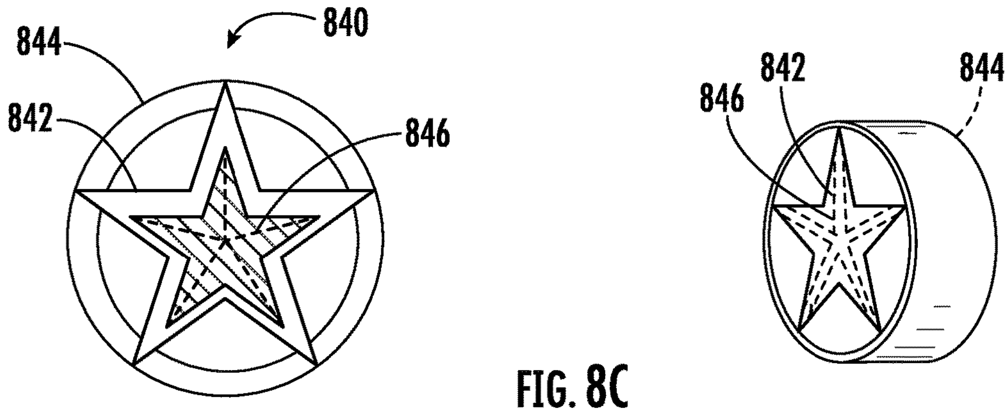

FIGS. 8A-8C illustrate example wheel hub displays according to an embodiment hereof. In particular, FIG. 8A illustrates a wheel 800 including a round display 802. The round display 802 can be a tablet-like device. For instance, the display 802 can include a screen, motherboard, battery, metallic backing, and/or other suitable hardware. As illustrated in FIG. 8A, the round display 802 can occupy substantially the entire surface area of the face of a wheel rim (not illustrated) such that the round display 802 obscures the wheel rim from an observer. In some implementations, the round display 802 can be a high resolution circular display, such as a 4K display, an 8K display, a 1080×1080 display, or another suitable display. Although the round display 802 is illustrated as being a monolithic display in FIG. 8A, the round display 802 could be formed from several partial segments. As one example, the round display 802 could be formed of several "pie-shaped slices" of display. For instance, each "slice" of the overall display could be affixed to a spoke or other portion of the wheel 800.

Figure 8D:
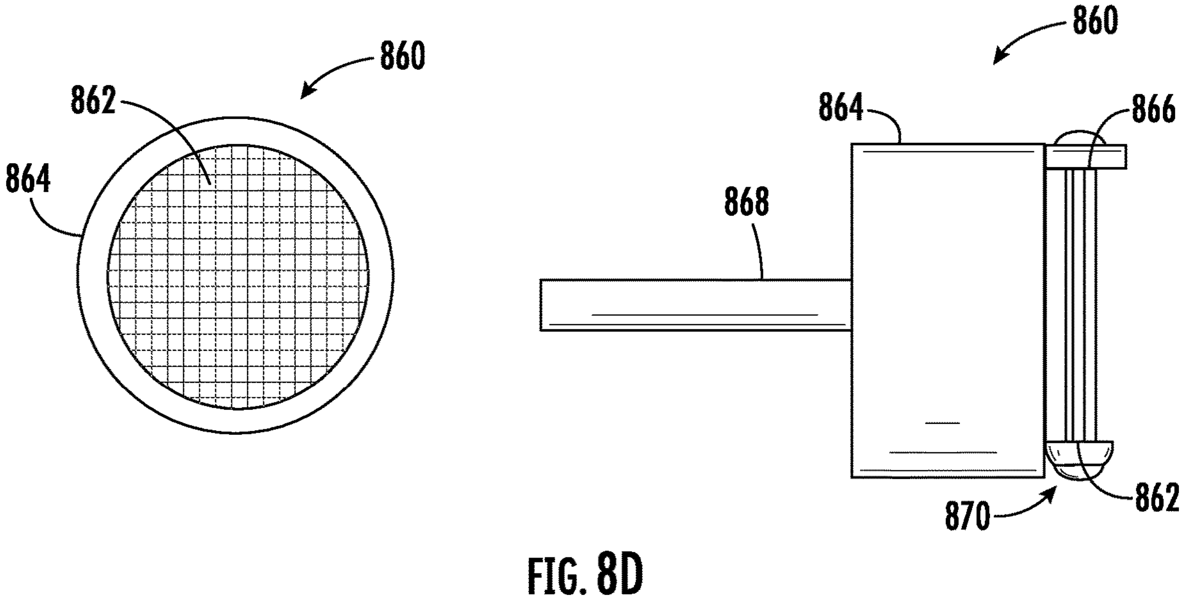

In some implementations, the round display 802 can include a protective layer 806. The protective layer 806 can shield the round display 802 from climate conditions, debris, road conditions (e.g., potholes), and other elements that could damage the round display 802. As one example, the protective layer 806 is made of a shatter-proof glass or plastic material. In some implementations, the display 802 can be slotted into a case including the protective layer 806. One example case is illustrated in FIG. 8D.

The wheel 800 additionally includes a tire 804. As illustrated in FIG. 8A, the round display 802 may not cover the tire 804. However, in some implementations, the round display 802 may cover some or all of the tire 804. The wheel 800 can be arranged on an axle 808 such that the wheel 800 can roll on the axle 808 and propel a vehicle. In some implementations, an inductive power system can transfer power from rotation of the axle 808 (or another suitable vehicle component) to power the round display 802.

In some implementations, the wheel 800 (e.g., the round display 802) can include or can otherwise be in communication with a display driver. The display driver can map an image in computer-readable format (e.g., the generated content 656) to the pixels of the round display 802. Additionally or alternatively, the display driver can be incorporated into wheel electronics that can obtain data points for the wheel, such as tire pressure, temperature, wheel speed, and so on.

FIG. 8B illustrates another example wheel 820 including a hub display 822. As illustrated in FIG. 8B, the hub display 822 can occupy about the surface area of a hub cap in the center of wheel 820. For instance, in some implementations, the hub display 822 can be built into a hub cap. As another example, in some implementations, the hub display 822 can cover a conventional hub cap. In some implementations, the hub display 822 can be a high resolution circular display, such as a 4K display, an 8K display, a 1080×1080 display, or another suitable display.

In some implementations, the hub display 822 can include a protective layer 826. The protective layer 826 can shield the hub display 822 from climate conditions, debris, road conditions (e.g., potholes), and other elements that could damage the hub display 822. As one example, the protective layer 826 is made of a shatter-proof glass or plastic material.

The wheel 820 additionally includes a tire 824. The wheel 820 can be arranged on an axle 828 such that the wheel 820 can roll on the axle 828 and propel a vehicle. As illustrated in FIG. 8B, the hub display 822 can be arranged on a hub cap that covers the meeting point of the wheel 820 and the axle 828. In some implementations, an inductive power system can transfer power from rotation of the axle 828 (or another suitable vehicle component) to power the hub display 822.

In some implementations, the wheel 820 (e.g., the hub display 822) can include or can otherwise be in communication with a display driver. The display driver can map an image in computer-readable format (e.g., the generated content 656) to the pixels of the hub display 822. Additionally or alternatively, the display driver can be incorporated into wheel electronics that can obtain data points for the wheel, such as tire pressure, temperature, wheel speed, and so on.

FIG. 8C illustrates another example wheel 840 including a three-dimensional display 842 arranged on spokes 846. As illustrated in FIG. 8C, the three-dimensional display 842 can be arranged on the spokes 846 such that the display occupies at least a portion of free space between the spokes. For instance, pixels of the three-dimensional display 842 can be arranged in rows and the rows of pixels can be layered into the width of the wheel 840.

The wheel 840 additionally includes a tire 844. In some implementations, the wheel 840 (e.g., the three-dimensional display 842) can include or can otherwise be in communication with a display driver. The display driver can map an image in computer-readable format (e.g., the generated content 656) to the pixels of the three-dimensional display 842. For instance, the display driver can convert a three-dimensional model or a two-dimensional image into a format that can be displayed by pixels of the three-dimensional display 842. Additionally or alternatively, the display driver can be incorporated into wheel electronics that can obtain data points for the wheel, such as tire pressure, temperature, wheel speed, and so on.

FIG. 8D illustrates another example wheel 860. The wheel 860 can include a display 862 and a tire 864 mounted to an axle 868. In particular, the display 862 can be incorporated into a case 870. The case 870 can be configured to shield the display 862 from debris and other forces during operation of the wheel 860. For instance, the case 870 can fully encompass the display 862 and/or related electronic components. The case 870 can include a protective layer 866 that protects the screen portion of display 862.

As one example, in some embodiments, the display 862 can be a tablet-like device with a shell including hardware components such as a screen, motherboard, battery, etc. The display 862 can slot into the case 870 such that the case protects the display 862 from several angles. For instance, in some implementations, the case 870 includes a rubber outer shell with cushioning at the edges of the shell. The rubber outer shell can protect the display 862 by absorbing shock forces on the wheel 860 (e.g., from the tire 864) that are transferred to the wheel rim. Additionally or alternatively, the rubber outer shell can allow for some movement while maintaining a water-safe seal between the rim and the display 862. Additionally or alternatively, in some cases, the rubber outer shell can shield the display 862 should the display 862 become detached from the wheel 860.

In some implementations, the case 870 can be a toroidal shape with an extended area along the outside. The case 870 can include a portion that is composed of a harder material, such as a hard rubber or plastic, that is configured to be fitted or otherwise secured to the wheel 860 (e.g., to a wheel rim). For instance, in some implementations, the wheel rim may be fitted with an inverse half-toroidal shape to accommodate the case 870.

Figure 9:
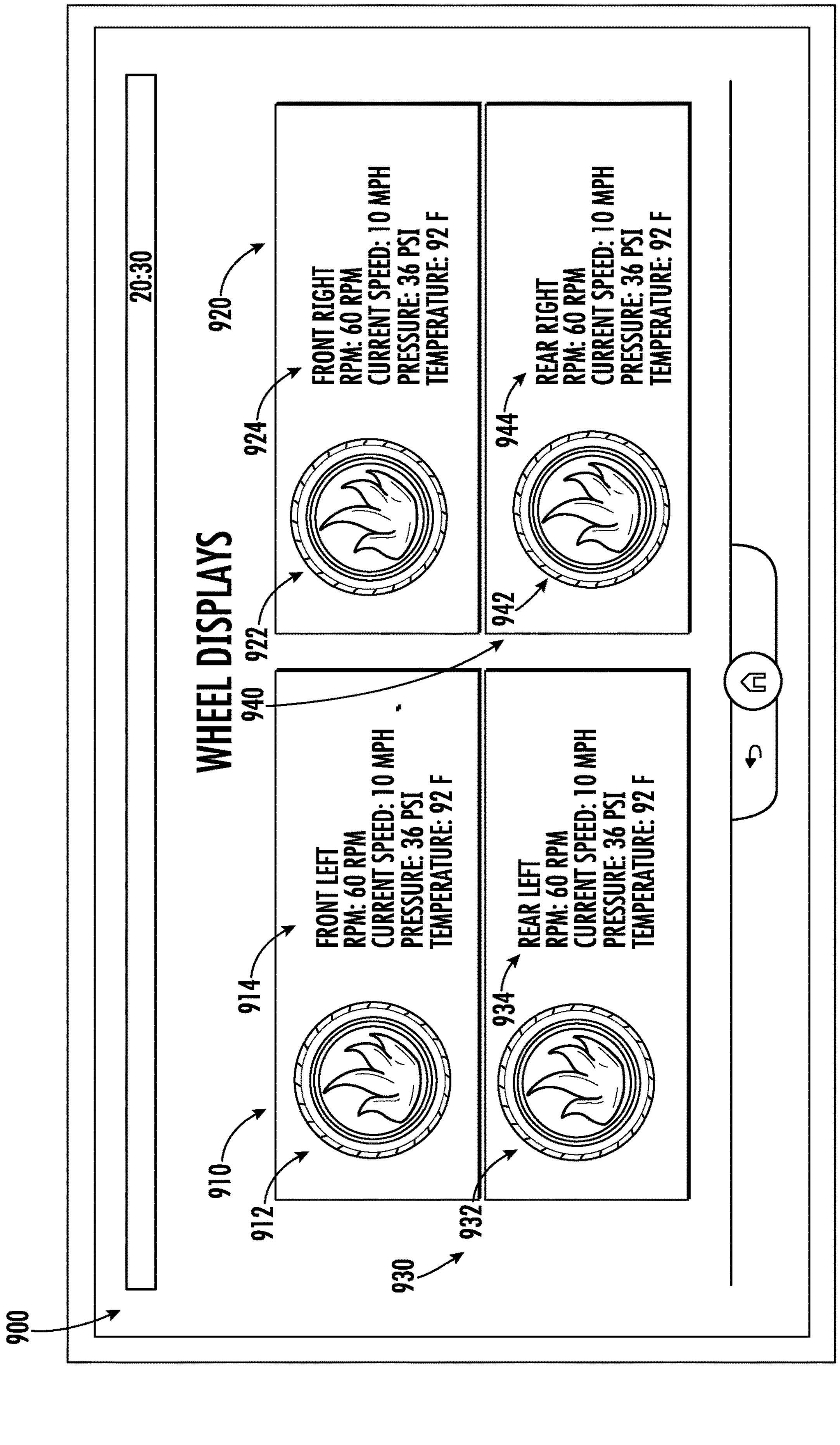
FIG. 9 illustrates an example user interface according to an embodiment hereof.

FIG. 9 illustrates an example user interface 900 according to an embodiment hereof. The example user interface 900 can be displayed, for example, on an infotainment system of a vehicle (e.g., vehicle 105). The interface 900 can include informational elements 910, 920, 930, and 940 each corresponding to a given wheel of a vehicle. For instance, element 910 can correspond to a front left wheel. Element 910 can include display 912 that depicts the current content displayed on the wheel hub display of the front left wheel. Additionally, element 910 can include information 914 such as current RPM of the front left wheel, current linear speed of the front left wheel, current tire pressure of the front left wheel, and current temperature of the front left wheel.

Additionally, element 920 can correspond to a front right wheel. Element 920 can include display 922 that depicts the current content displayed on the wheel hub display of the front right wheel. Additionally, element 920 can include information 924 such as current RPM of the front right wheel, current linear speed of the front right wheel, current tire pressure of the front right wheel, and current temperature of the front right wheel.

Additionally, element 930 can correspond to a rear left tire. Element 930 can include display 932 that depicts the current content displayed on the wheel hub display of the rear left wheel. Additionally, element 930 can include information 934 such as current RPM of the rear left wheel, current linear speed of the rear left wheel, current tire pressure of the rear left wheel, and current temperature of the rear left wheel.

Finally, element 940 can correspond to a rear right tire. Element 940 can include display 942 that depicts the current content displayed on the wheel hub display of the rear right wheel. Additionally, element 940 can include information 944 such as current RPM of the rear right wheel, current linear speed of the rear right wheel, current tire pressure of the rear right wheel, and current temperature of the rear right wheel.

Figure 10:
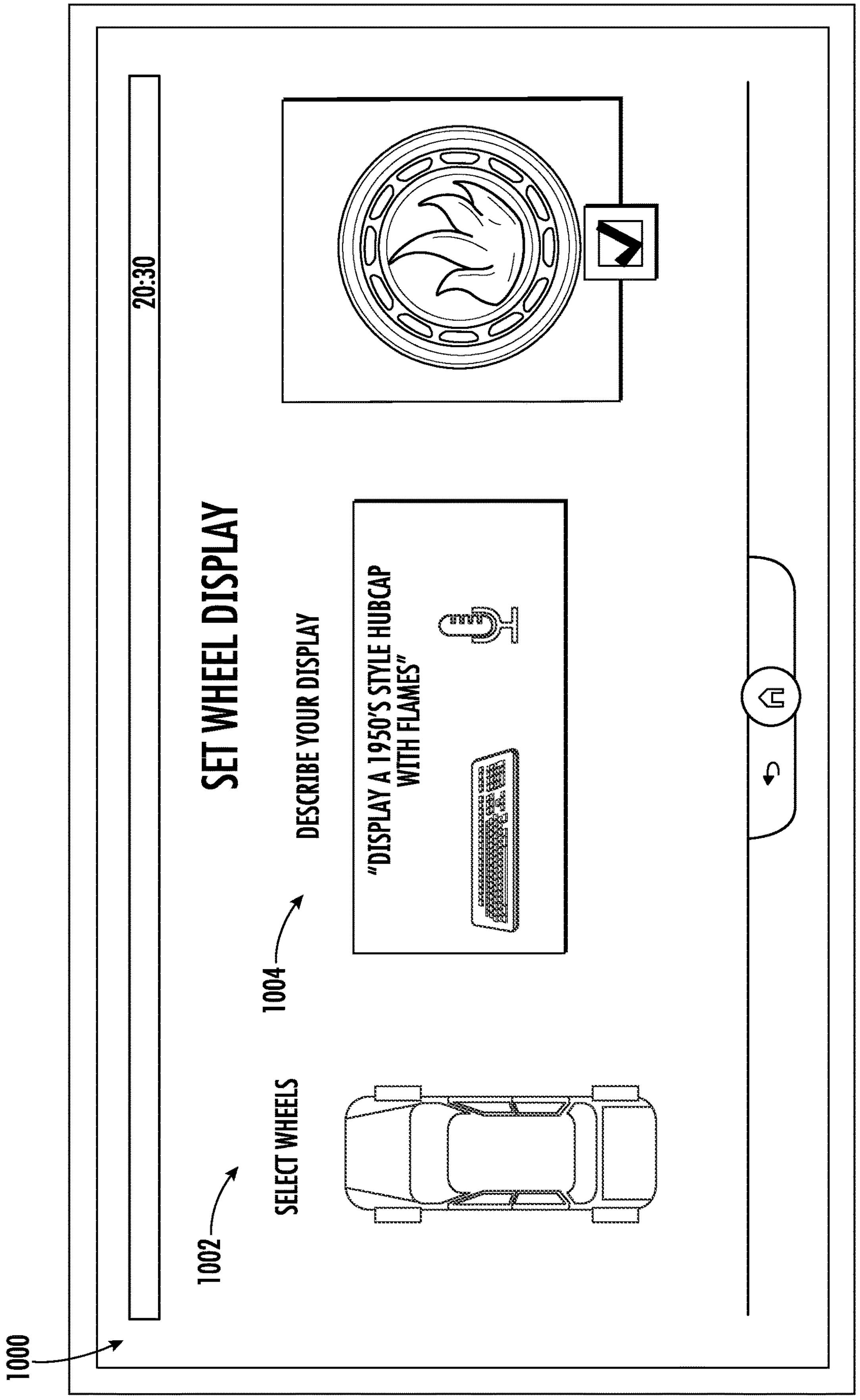
FIG. 10 illustrates an example user interface according to an embodiment hereof.

FIG. 10 illustrates an example user interface 1000 according to an embodiment hereof. The example user interface 1000 can be displayed, for example, on an infotainment system of a vehicle (e.g., vehicle 105). The example user interface 1000 can provide a user with controls to generate new content for display on the wheel displays of the vehicle (e.g., 105). For instance, the user can first interact with element 1002 to select which wheels to generate new content for. As one example, the user can tap, click, or otherwise interact with elements uniquely corresponding to each wheel of the vehicle. Additionally or alternatively, the user can interact with element 1004 to input user input data describing the content to be generated. For instance, in some example implementations, the user can speak the description of the display and the vehicle computing system 200 can convert the user's spoken description into text data through any suitable speech-to-text system. As another example, the user can interact with an element to bring up an on-screen keyboard to manually type the description. After receiving the user input data, content can be generated as described herein. In some implementations, the interface 1000 includes element 1006 providing for a user to confirm the result of the generated content before it is displayed on the wheel hub displays of the vehicle. In some implementations, a plurality of content items may be generated based on the user input data and element 1006 may provide for the user to select which, if any, content items will be displayed on the wheel hub display.

As yet another example, in some implementations, a user may upload images, videos, or other content from a user device (e.g., a mobile device) and either display the image on the wheel display or use the image as an input to produce the generated content. Furthermore, in some implementations, the user can take a picture using an in-cabin camera and provide it as input to produce the generated content. For instance, the user may provide an image and a prompt such as "display my image with me wearing a cowboy hat" and the system 200 can generate content depicting the user's image with a cowboy hat. The generated image with cowboy hat could then be displayed on the wheel displays of the vehicle.

Figure 11:
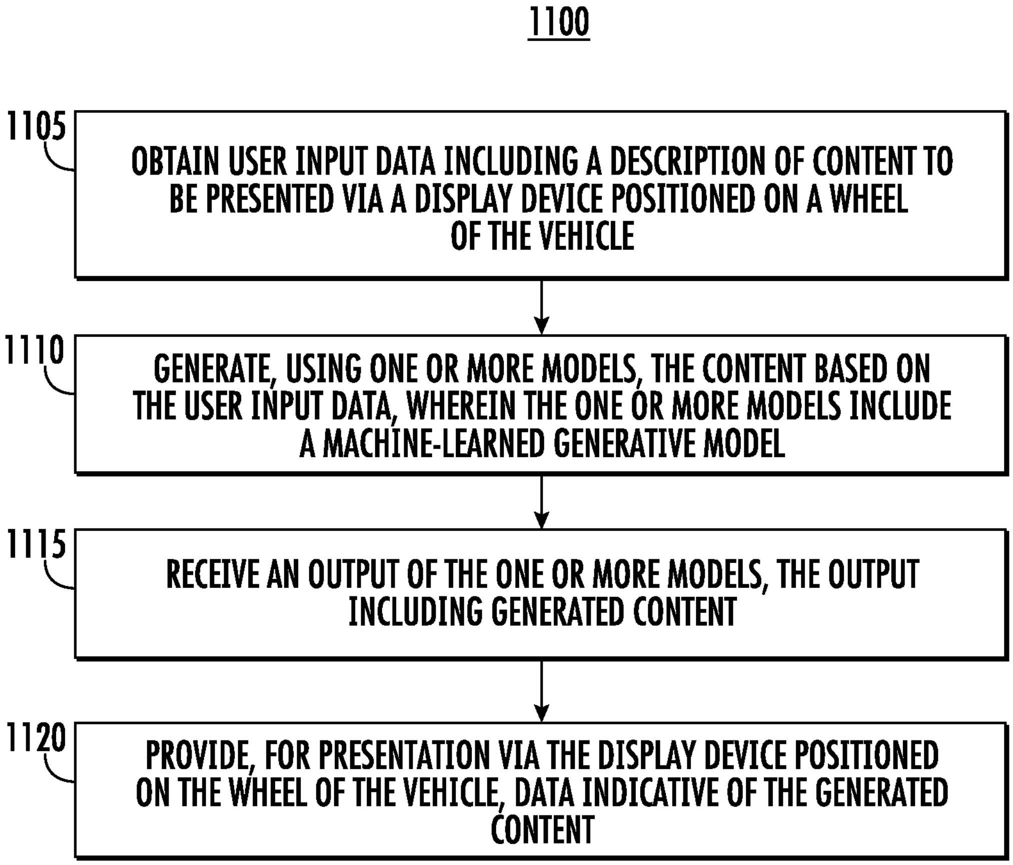
FIG. 11 illustrates a flowchart diagram of an example method according to an embodiment hereof.

FIG. 11 illustrates a flowchart diagram of an example method 1100 for generative model of wheel hub display content according to an embodiment hereof. The method 1100 may be performed by a computing system described with reference to the other figures. In an embodiment, the method 1100 may be performed by the control circuit 6015 of the computing system 6005 of FIG. 12. One or more portions of the method 1100 may be implemented as an algorithm on the hardware components of the devices described herein (e.g., as in FIGS. 1, 4, 5, 12, etc.). For example, the steps of method 1100 may be implemented as operations/instructions that are executable by computing hardware.

FIG. 11 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 11 is described with reference to elements/terms described with respect to other systems and figures for example illustrated purposes and is not meant to be limiting. One or more portions of method 1100 may be performed additionally, or alternatively, by other systems. For example, method 1100 may be performed by a control circuit of the remote computing platform 110, the vehicle computing system 200, the user device 115, and so on.

In an embodiment, the method 1100 may begin with or otherwise include an operation 1105, in which the computing system 200 obtains user input data 652 including a description of content to be presented via a display device (e.g., 800) positioned on a wheel of the vehicle 105. The user input 652 can be a natural language input provided from a user. The user input 652 can include a description of content to be presented via a display device positioned on a wheel of a vehicle. As an example, the user input data 652 can be obtained from an application on a user device, a vehicle infotainment system, or other suitable computing device. In addition to the user input data 652, in some implementations, the generative model 620 can receive wheel parameters 654 describing parameters of the wheel on which the content is to be displayed, such as display type (e.g., 3D, 2D, etc.), display size, wheel type, wheel size, and so on. Based on the user input data 652 and/or the wheel parameters 654, the generative model 620 can produce the generated content 656 for display on the wheel hub display device.

Furthermore, in some implementations, the user input data 652 can be indicative of a timing of display for the generated content 656. The generated content 656 can be presented via the display device based on the timing of display indicated by the user input data 652. For example, a user may describe a certain generated content 656 that is only displayed at night. The vehicle computing system 200 can thus only display the generated content 656 when it is night. For instance, the timing of display can be compared to current time characteristics to determine whether to display the generated content 656.

In an embodiment, the method 1100 may include an operation 1110, in which the computing system 200 generates, using one or more models (e.g., generative model 620, physics-based model 660), the content 656 based on the user input data. In particular, the one or more models can include a machine-learned generative model 620. In some implementations, the generative model can be a generative adversarial network trained to provide the generated content based on the user input data. To generate the content, the computing system 200 can be configured to input the user input data 652 into the machine-learned generative model 620. The machine-learned generative model 620 can be trained to process the user input data 652 and provide generated content 656 that is: (i) based on the description of the content included in the user input data 652, and (ii) configured for presentation via the display device (e.g., 800) positioned on the wheel of the vehicle.

For instance, the machine-learned generative model 620 can be trained based on training data 610 indicative of a plurality of wheel-based features. For instance, the training data 610 can include data indicating wheel rims, hubs, hub caps, spokes, tires, and so on. As examples, the training data 610 can include training images, training models (e.g., 3D models), training videos, training graphics, training icons, and other suitable training data indicative of wheel-based features. The training data 610 can include two-dimensional image content and/or three-dimensional image content. For instance, in some implementations, the training data 610 can be organized into collections or bins. The collections or bins may be indexed by type (e.g., 2D vs. 3D), content type, subject area, etc. In some implementations, the training data 610 can be gathered from open-source data publicly available on the Internet or other data store. Additionally or alternatively, the training data 610 can include proprietary data.

For instance, the training data 610 can include existing wheel training data 611. The existing wheel training data 611 can indicate a plurality of historical or otherwise existing wheels and/or portions thereof, such as rims, spokes, hubs, hub caps, tires, etc. For example, in some implementations, the existing wheel training data 611 can include images, videos, etc. of historical wheel rims labeled with descriptors of wheel rims, such as, for example, an image of a 1950's convertible wheel rim labeled with tags or descriptors such as "1950s," "convertible," "rim," tags describing the make, model, year, and so on to facilitate training the generative model 620. In some implementations, the labels may be automatically generated.

Additionally or alternatively, the training data 610 can include media training data 612. The media training data 612 can include data indicating media such as, for example, characters (e.g., cartoon characters), actors, brands or logos, objects, and other suitable media. The media training data 612 can be labeled with tags or descriptors describing the character, actor, etc. In some implementations, operators of the model trainer 615 can license, purchase, or otherwise access databases provided by owners of the media to obtain the media training data 612.

Additionally or alternatively, the training data 610 can include effects training data 613. The effects training data 613 can indicate a plurality of effects, such as physical effects. As examples, the effects training data 613 can indicate effects such as fire, bubbles, light, colors, water, plants, flags, and other suitable physical effects. The effects training data 613 can be labeled with tags or descriptors indicating the type of effect.

Additionally or alternatively, the training data 610 can include specifications 614. The specifications 614 can describe aspects of wheels and wheel rims, such as, for example, a size, a shape, an associated vehicle model, a year, or a material associated with a given wheel or wheel rim. For instance, in some implementations, the generated content is configured for presentation via the display device positioned on the wheel such that the generated content is formatted and fitted for the display device positioned on the wheel. The specifications 614 can facilitate formatting and fitting the generated content for presentation via the display device.

Additionally and/or alternatively, the one or more models can include a physics-based model 660 configured to model one or more motion parameters of the vehicle. For instance, the physics-based model 660 can produce motion parameters 665 that model the motion of the vehicle and/or the wheel. As examples, the motion parameters 665 can include a motion of the wheel, a speed of the vehicle, an acceleration of the vehicle, or a heading of the vehicle. To generate the content 656, the system 650 can input the motion parameters 665 into the machine-learned generative model 620. The machine-learned generative model 620 can then produce output (e.g., generated content 656) that is based on the motion parameters 665. As an example, the output can include an animation based on the generated content 656. For instance, the animation can include animated motion of an element in the generated content 656 based on at least one of the motion parameters 665 (e.g., at least one of the motion of the wheel, the speed of the vehicle, the acceleration of the vehicle, or the heading of the vehicle).

In some implementations, the user input data 652 can be indicative of a physics event associated with the vehicle. The presentation of the data indicative of the generated content 656 via the display device positioned on the wheel can then be based on the physics event. As one example, the user may describe a flame effect that bends backwards when accelerating as if affected by wind from acceleration. To facilitate this effect, the physics-based model 660 can model motion parameters 665 descriptive of acceleration such that the generative model 620 can produce generated content 656 that follows this physics effect. As another example, in some implementations, the user may describe content that flashes red when the vehicle is braking or decelerating, so the physics-based model 660 can produce motion parameters 665 that model vehicle braking or deceleration for the generative model 620.

Various approaches may be used to configure the machine-learned generative model to provide generated content 656 that is configured for presentation via the display device positioned on the wheel of the vehicle. For example, the model can be configured such that the generated content is formatted and fitted for the display device positioned on the wheel. For instance, the machine-learned generative model can be trained on images that are the size and shape of the display device such that the model's output. Additionally, or alternatively, the machine-learned generative model can be trained to receive an input indicative of the size and shape of the display device. The model can process image(s) to crop the image(s), reformat the image(s), or otherwise transform the image(s) for generating content that will fit the size, shape, resolution, or other display parameters of the display device. In some implementations, the transformation may be performed on the generated content by the machine-learned model or through post-processing of the generated content. In some implementations, the machine-learned generative model can create and output the generated content such that it matches the resolution of the display device positioned on the wheel.

In an embodiment, the method 1100 may include an operation 1115, in which the computing system 200 receives an output of the one or more models, the output including the generated content 656. For instance, in some implementations, the computing system 200 can process the output of the one or more models to generate the data indicative of the generated content for presentation via the display device. As an example, the output of the one or more models may be trimmed, formatted, or otherwise adjusted such that the content will be displayed properly on the display device. As another example, the output of the one or more models may be filtered for inappropriate content, such as offensive or obscene content, content without proper licensing, and so on, such that inappropriate content is not displayed on the display device.

In an embodiment, the method 1100 may include an operation 1120, in which the computing system 200 provides, for presentation via the display device (e.g., 800) positioned on the wheel of the vehicle, data indicative of the generated content 656. For instance, the computing system 200 can communicate the data indicative of the generated content from the computing system 200 to a display driver or other computing device configured to provide the content for display on the display device. As another example, the computing system 200 can display the content via the display device directly. The data indicative of the generated content can include static content or animated content based on the generated content. In some implementations, the data indicative of the generated content can be further processed such that it can be presented via the display device.

Figure 12:
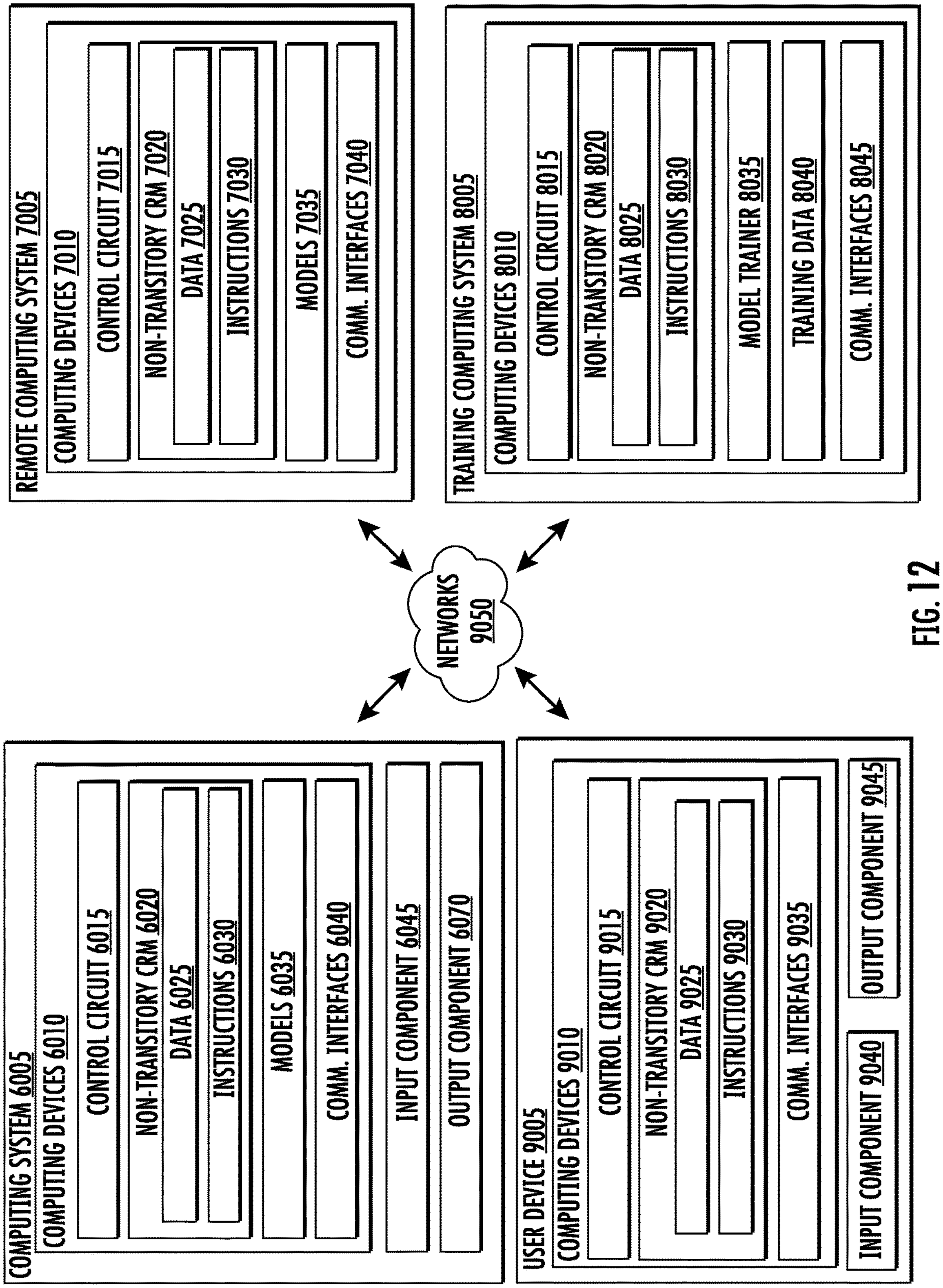
FIG. 12 illustrates a diagram of an example computing ecosystem with computing components according to an embodiment hereof.

FIG. 12 illustrates a block diagram of an example computing system 7000 according to an embodiment hereof. The system 7000 includes a computing system 6005 (e.g., a computing system onboard a vehicle), a remote computing system 7005 (e.g., a server computing system, cloud computing platform), a user device 9005 (e.g., a user's mobile device), and a training computing system 8005 that are communicatively coupled over one or more networks 9050.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to perform any of the operations, methods and/or processes described herein. In some cases, the non-transitory computer-readable medium 6020 may store computer-executable instructions or computer-readable instructions, such as instructions to perform at least a portion of the method of FIG. 11.

In an embodiment, the computing system 6005 may store or include one or more machine-learned models 6035. For example, the machine-learned models 6035 may be or may otherwise include various machine-learned models, including machine-learned generative models (e.g., the machine-learned generative model 620 of FIGS. 6A-6B). In an embodiment, the machine-learned models 6035 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models). As another example, the machine-learned models 6035 can include generative models, such as stable diffusion models, generative adversarial networks (GAN), GPT models, and other suitable models.

In an aspect of the present disclosure, the models 6035 may be used to produce generated content for a wheel hub display. For example, the machine-learned models 6035 can, in response to user input data descriptive of content to be displayed on a wheel hub display, produce generated content to be displayed on that wheel hub display according to the description provided by the user input data.

In an embodiment, the one or more machine-learned models 6035 may be received from the server computing system 7005 over networks 9050, stored in the computing system 6005 (e.g., non-transitory computer-readable medium 6020), and then used or otherwise implemented by the control circuit 6015. In an embodiment, the computing system 6005 may implement multiple parallel instances of a single model.

Additionally, or alternatively, one or more machine-learned models 6035 may be included in or otherwise stored and implemented by the remote computing system 7005 that communicates with the computing system 6005 according to a client-server relationship. For example, the machine-learned models 6035 may be implemented by the server computing system 7005 as a portion of a web service. Thus, one or more models 6035 may be stored and/or implemented (e.g., as models 7035) at the computing system 6005 and/or one or more models 6035 may be stored and implemented at the remote computing system 7005.

The computing system 6005 may include one or more communication interfaces 6040. The communication interfaces 6040 may be used to communicate with one or more other systems. The communication interfaces 6040 may include any circuits, components, software, etc. for communicating via one or more networks (e.g., networks 9050). In some implementations, the communication interfaces 6040 may include for example, one or more of a communications controller, receiver, transceiver, transmitter, port, conductors, software and/or hardware for communicating data/information.

The computing system 6005 may also include one or more user input components 6045 that receives user input. For example, the user input component 6045 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6050. The output components 6050 may include hardware and/or software for audibly or visually producing content. For instance, the output components 6050 may include one or more speakers, earpieces, headsets, handsets, etc. The output components 6050 may include a display device, which may include hardware for displaying a user interface and/or messages for a user. By way of example, the output component 6050 may include a display screen, CRT, LCD, plasma screen, touch screen, TV, projector, tablet, and/or other suitable display components.

The server computing system 7005 may include one or more computing devices 7010. In an embodiment, the server computing system 7005 may include or is otherwise implemented by one or more server computing devices. In instances in which the server computing system 7005 includes plural server computing devices, such server computing devices may operate according to sequential computing architectures, parallel computing architectures, or some combination thereof.

The server computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the server system 7005 may obtain data from one or more memories that are remote from the server system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium 7020 may store instructions 7030 that when executed by the control circuit 7015 cause the control circuit 7015 to perform any of the operations, methods and/or processes described herein. In some cases, the non-transitory computer-readable medium 7020 may store computer-executable instructions or computer-readable instructions, such as instructions to perform at least a portion of the method of FIG. 11.

The server computing system 7005 may include one or more communication interfaces 7035. The communication interfaces 7035 may be used to communicate with one or more other systems. The communication interfaces 7035 may include any circuits, components, software, etc. for communicating via one or more networks (e.g., networks 7050). In some implementations, the communication interfaces 7035 may include for example, one or more of a communications controller, receiver, transceiver, transmitter, port, conductors, software and/or hardware for communicating data/information.

The computing system 6005 and/or the server computing system 7005 may train the models 6035, 7035 via interaction with the training computing system 8005 that is communicatively coupled over the networks 9050. The training computing system 8005 may be separate from the server computing system 7005 or may be a portion of the server computing system 7005.

The training computing system 8005 may include one or more computing devices 8010. In an embodiment, the training computing system 8005 may include or is otherwise implemented by one or more server computing devices. In instances in which the training computing system 8005 includes plural server computing devices, such server computing devices may operate according to sequential computing architectures, parallel computing architectures, or some combination thereof.

The training computing system 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 8020 (e.g., memory devices) may store data 8025 that may be obtained, received, accessed, written, manipulated, created, and/or stored. The data 8025 may include, for instance, any of the data or information described herein. In some implementations, the training computing system 8005 may obtain data from one or more memories that are remote from the training computing system 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to perform at least a portion of the methods of FIG. 11.

The training computing system 8005 may include a model trainer 8035 that trains the machine-learned models 6035, 7035 stored at the computing system 6005 and/or the remote computing system 7005 using various training or learning techniques. For example, the models 6035, 7035 (e.g., a machine-learned generative model) may be trained using a loss function that evaluates quality of generated samples over various characteristics, such as similarity to the training data.

The training computing system 8005 may modify parameters of the models 6035, 7035 (e.g., the machine-learned clustering model 320) based on the loss function (e.g., generative loss function) such that the models 6035, 7035 may be effectively trained for specific applications in a supervised manner using labeled data and/or in an unsupervised manner.

In an example, the model trainer 8035 may backpropagate the loss function through the machine-learned clustering model 320 to modify the parameters (e.g., weights) of the generative model (e.g., 620). The model trainer 8035 may continue to backpropagate the clustering loss function through the machine-learned model, with or without modification of the parameters (e.g., weights) of the model. For instance, the model trainer 8035 may perform a gradient descent technique in which parameters of the machine-learned model may be modified in a direction of a negative gradient of the clustering loss function. Thus, in an embodiment, the model trainer 8035 may modify parameters of the machine-learned model based on the loss function.

The model trainer 8035 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 8035 may perform a number of generalization techniques (e.g., weight decays, dropouts, etc.) to improve the generalization capability of a model being trained. In particular, the model trainer 8035 may train the machine-learned models 6035, 7035 based on a set of training data 8040.

The training data 8040 may include unlabeled training data for training in an unsupervised fashion. Furthermore, in some implementations, the training data 8040 can include labeled training data for training in a supervised fashion. For example, the training data 8040 can be or can include the training data 610 of FIG. 6A.

In an embodiment, if the user has provided consent/authorization, training examples may be provided by the computing system 6005 (e.g., of the user's vehicle). Thus, in such implementations, a model 6035 provided to the computing system 6005 may be trained by the training computing system 8005 in a manner to personalize the model 6035.

The model trainer 8035 may include computer logic utilized to provide desired functionality. The model trainer 8035 may be implemented in hardware, firmware, and/or software controlling a general-purpose processor. For example, in an embodiment, the model trainer 8035 may include program files stored on a storage device, loaded into a memory and executed by one or more processors. In other implementations, the model trainer 8035 may include one or more sets of computer-executable instructions that are stored in a tangible computer-readable storage medium such as RAM, hard disk, or optical or magnetic media.

The training computing system 8005 may include one or more communication interfaces 8045. The communication interfaces 8045 may be used to communicate with one or more other systems. The communication interfaces 8045 may include any circuits, components, software, etc. for communicating via one or more networks (e.g., networks 9050). In some implementations, the communication interfaces 8045 may include for example, one or more of a communications controller, receiver, transceiver, transmitter, port, conductors, software and/or hardware for communicating data/information.

The computing system 6005, the remote computing system 7005, and/or the training computing system 8005 may also be in communication with a user device 9005 that is communicatively coupled over the networks 9050.

The user device 9005 may include one or more computing devices 9010. The user device 9005 may include a control circuit 9015 and a non-transitory computer-readable medium 9020, also referred to herein as memory 9020. In an embodiment, the control circuit 9015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 9015 may be programmed by one or more computer-readable or computer-executable instructions stored on the non-transitory computer-readable medium 9020.

In an embodiment, the non-transitory computer-readable medium 9020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 9020 may store information that may be accessed by the control circuit 9015. For instance, the non-transitory computer-readable medium 9020 (e.g., memory devices) may store data 9025 that may be obtained, received, accessed, written, manipulated, created, and/or stored. The data 9025 may include, for instance, any of the data or information described herein. In some implementations, the user device 9005 may obtain data from one or more memories that are remote from the user device 9005.

The non-transitory computer-readable medium 9020 may also store computer-readable instructions 9030 that may be executed by the control circuit 9015. The instructions 9030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 9015 to perform one or more functional tasks. The modules and computer-readable/executable instructions may be described as performing various operations or tasks when the control circuit 9015 or other hardware component is executing the modules or computer-readable instructions.

The instructions 9030 may be executed in logically or virtually separate threads on the control circuit 9015. For example, the non-transitory computer-readable medium 9020 may store instructions 9030 that when executed by the control circuit 9015 cause the control circuit 9015 to perform any of the operations, methods and/or processes described herein. In some cases, the non-transitory computer-readable medium 9020 may store computer-executable instructions or computer-readable instructions, such as instructions to perform at least a portion of the method of FIG. 11.

The user device 9005 may include one or more communication interfaces 9035. The communication interfaces 9035 may be used to communicate with one or more other systems. The communication interfaces 9035 may include any circuits, components, software, etc. for communicating via one or more networks (e.g., networks 7050). In some implementations, the communication interfaces 9035 may include for example, one or more of a communications controller, receiver, transceiver, transmitter, port, conductors, software and/or hardware for communicating data/information.

The user device 9005 may also include one or more user input components 9040 that receives user input. For example, the user input component 9040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 9005 may include one or more output components 9045. The output components 9045 may include hardware and/or software for audibly or visually producing content. For instance, the output components 9045 may include one or more speakers, earpieces, headsets, handsets, etc. The output components 9045 may include a display device, which may include hardware for displaying a user interface and/or messages for a user. By way of example, the output component 9045 may include a display screen, CRT, LCD, plasma screen, touch screen, TV, projector, tablet, and/or other suitable display components.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Additional Discussion of Various Embodiments

Embodiment 1 relates to a computing system of a vehicle. The computing system may include a control circuit. The control circuit may be configured to obtain user input data including a description of content to be presented via a display device positioned on a wheel of the vehicle. The control circuit may be configured to generate, using one or more models, the content based on the user input data. The one or more models can include a machine-learned generative model. To generate the content, the control circuit may be configured to input the user input data into the machine-learned generative model. The machine-learned generative model can be trained based on training data indicative of a plurality of wheel-based features. The machine-learned generative model may be trained to process the user input data and provide generated content that is: (i) based on the description of the content included in the user input data, and (ii) configured for presentation via the display device positioned on the wheel of the vehicle. The control circuit may be configured to receive an output of the one or more models, the output including the generated content. The control circuit may be configured to provide, for presentation via the display device positioned on the wheel of the vehicle, data indicative of the generated content.

Embodiment 2 includes the computing system of Embodiment 1. In this embodiment, the generative model is a generative adversarial network trained to provide the generated content based on the user input data.

Embodiment 3 includes the computing system of any of embodiments 1 or 2. In this embodiment, at least a portion of the wheel-based features are associated with images depicting at least one of: vehicle wheels, vehicle rims, tires, or hub caps, and at least a portion of the wheel-based features are associated with specifications for at least one of: the vehicle wheels, the vehicle rims, the tires, or the hub caps.

Embodiment 4 includes the computing system of any of embodiments 1 to 3. In this embodiment, the specifications are indicative of at least one of: a size, a shape, an associated vehicle model, a year, or a material.

Embodiment 5 includes the computing system of any of embodiments 1 to 4. In this embodiment, the training data further includes data indicative at least one of: training images, training icons, training graphics, or training videos.

Embodiment 6 includes the computing system of any of embodiments 1 to 5. In this embodiment, the generated content includes at least one of: two-dimensional image content or three-dimensional image content.

Embodiment 7 includes the computing system of any of embodiments 1 to 6. In this embodiment, the one or more models include a physics-based model configured to model one or more motion parameters of the vehicle.

Embodiment 8 includes the computing system of any of embodiments 1 to 7. In this embodiment, the motion parameters include least one of: a motion of the wheel, a speed of the vehicle, an acceleration of the vehicle, or a heading of the vehicle, Embodiment 9 includes the computing system of any of embodiments 1 to 8. In this embodiment, to generate the content, the control circuit is configured to input the motion parameters into the machine-learned generative model.

Embodiment 10 includes the computing system of any of embodiments 1 to 9. In this embodiment, the output is based on the motion parameters of the vehicle, the output includes an animation based on the generated content, and the animation includes animated motion of an element based on at least one of: the motion of the wheel, the speed of the vehicle, the acceleration of the vehicle, or the heading of the vehicle.

Embodiment 11 includes the computing system of any of embodiments 1 to 10. In this embodiment, the generated content is configured for presentation via the display device positioned on the wheel such that the generated content is formatted and fitted for the display device positioned on the wheel.

Embodiment 12 includes the computing system of any of embodiments 1 to 11. In this embodiment, the user input is indicative of a physics event associated with the vehicle and the presentation of the data indicative of the generated content via the display device positioned on the wheel is based on the physics event.

Embodiment 13 includes the computing system of any of embodiments 1 to 12. In this embodiment, the user input data is indicative of a timing of display for the generated content, and the output is presented via the display device based on the timing of display indicated by the user input data.

Embodiment 14 includes the computing system of any of embodiments 1 to 13. In this embodiment, the user input data is a natural language input provided from a user.

Embodiment 15 relates to a computer-implemented method. The method can include obtaining user input data includes a description of content to be presented via a display device positioned on a wheel of the vehicle. The method can include generating, using one or more models, the content based on the user input data. The one or more models can include a machine-learned generative model. Generating the content can include inputting the user input data into the machine-learned generative model. The machine-learned generative model can be trained based on training data indicative of a plurality of wheel-based features. The machine-learned generative model can be trained to process the user input data and provide generated content that is: (i) based on the description of the content included in the user input data, and (ii) configured for presentation via the display device positioned on the wheel of the vehicle. The method can include receiving an output of the one or more models, the output including the generated content. The method can include providing, for presentation via the display device positioned on the wheel of the vehicle, data indicative of the generated content.

Embodiment 16 includes the method of embodiment 15. In this embodiment, the generative model is a generative adversarial network trained to provide the generated content based on the user input data.

Embodiment 17 includes the method of any of embodiments 15 or 16. In this embodiment, the generated content includes an image augmented with an icon or a graphic.

Embodiment 18 includes the method of any of embodiments 15 to 17. In this embodiment, the method further includes processing the output of the one or more models to generate the data indicative of the generated content for presentation via the display device.

Embodiment 19 includes the method of any of embodiments 15 to 18. In this embodiment, the one or more models includes a physics-based model configured to model one or more motion parameters of the vehicle, the data indicative of the generated content includes an animation based on the generated content, and providing the data indicative of the generated content for presentation via the display device positioned on the wheel of the vehicle includes providing the animation for presentation via the display device such that the animation is presented based on the one or more motion parameters of the vehicle.

Embodiment 20 is directed to one or more non-transitory computer-readable media. The one or more non-transitory computer readable media can store instructions that are executable by a control circuit. The control circuit executing the instructions can obtain user input data including a description of content to be presented via a display device positioned on a wheel of the vehicle. The control circuit executing the instructions can generate, using one or more models, the content based on the user input data. The one or more models can include a machine-learned generative model. To generate the content, the control circuit can be configured to input the user input data into the machine-learned generative model. The machine-learned generative model can be trained based on training data indicative of a plurality of wheel-based features. The machine-learned generative model can be trained to process the user input data and provide generated content that is: (i) based on the description of the content included in the user input data, and (ii) configured for presentation via the display device positioned on the wheel of the vehicle. The control circuit executing the instructions can receive an output of the one or more models, the output including the generated content. The control circuit executing the instructions can provide, for presentation via the display device positioned on the wheel of the vehicle, data indicative of the generated content.

Additional Disclosure

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system of a vehicle comprising:

a control circuit configured to:

obtain user input data comprising a description of content to be presented via a display device positioned on a wheel of the vehicle;

generate, using one or more models, the content based on the user input data and one or more motion parameters of the vehicle, wherein the one or more models comprise a machine-learned generative model and a physics-based model configured to generate the one or more motion parameters of the vehicle, wherein to generate the content and the one or more motion parameters, the control circuit is configured to:

input the user input data into the machine-learned generative model, wherein the machine-learned generative model is trained based on training data indicative of a plurality of wheel-based features, input the one or more motion parameters into the machine-learned generative model, wherein the machine-learned generative model is trained to process the user input data and provide generated content that is: (i) based on the description of the content included in the user input data, and (ii) configured for presentation via the display device positioned on the wheel of the vehicle based on the one or more motion parameters of the vehicle, receive an output of the one or more models, the output comprising the generated content; and provide, for presentation via the display device positioned on the wheel of the vehicle, data indicative of the generated content.

2. The computing system of claim 1, wherein the machine-learned generative model is a generative adversarial network trained to provide the generated content based on the user input data.

3. The computing system of claim 1, wherein at least a portion of the wheel-based features are associated with images depicting at least one of: vehicle wheels, vehicle rims, tires, or hub caps, and wherein at least a portion of the wheel-based features are associated with specifications for at least one of: the vehicle wheels, the vehicle rims, the tires, or the hub caps.

4. The computing system of claim 3, wherein the specifications are indicative of at least one of: a size, a shape, an associated vehicle model, a year, or a material.

5. The computing system of claim 1, wherein the training data further comprises data indicative at least one of: training images, training icons, training graphics, or training videos.

6. The computing system of claim 1, wherein the generated content comprises at least one of: two-dimensional image content or three-dimensional image content.

7. The computing system of claim 1, wherein the one or more motion parameters comprise least one of: a motion of the wheel, a speed of the vehicle, an acceleration of the vehicle, or a heading of the vehicle.

8. The computing system of claim 7, wherein the output is based on the one or more motion parameters of the vehicle, wherein the output comprises an animation based on the generated content, and wherein the animation comprises animated motion of an element based on at least one of: the motion of the wheel, the speed of the vehicle, the acceleration of the vehicle, or the heading of the vehicle.

9. The computing system of claim 1, wherein the generated content is configured for presentation via the display device positioned on the wheel such that the generated content is formatted and fitted for the display device positioned on the wheel.

10. The computing system of claim 1, wherein the user input data is indicative of a physics event associated with the vehicle and the presentation of the data indicative of the generated content via the display device positioned on the wheel is based on the physics event.

11. The computing system of claim 1, wherein the user input data is indicative of a timing of display for the generated content, and wherein the output is presented via the display device based on the timing of display indicated by the user input data.

12. The computing system of claim 1, wherein the user input data is a natural language input provided from a user.

13. A computer-implemented method comprising:

obtaining user input data comprising a description of content to be presented via a display device positioned on a wheel of a vehicle;

generating, using one or more models, the content based on the user input data and one or more motion parameters of the vehicle, wherein the one or more models comprise a machine-learned generative model and a physics-based model configured to generate the one or more motion parameters of the vehicle, wherein generating the content and the one or more motion parameters, a control circuit is configured to:

inputting the user input data into the machine-learned generative model, wherein the machine-learned generative model is trained based on training data indicative of a plurality of wheel-based features, inputting the one or more motion parameters into the machine-learned generative model, wherein the machine-learned generative model is trained to process the user input data and provide generated content that is: (i) based on the description of the content included in the user input data, and (ii) configured for presentation via the display device positioned on the wheel of the vehicle based on the one or more motion parameters of the vehicle, receiving an output of the one or more models, the output comprising the generated content; and providing, for presentation via the display device positioned on the wheel of the vehicle, data indicative of the generated content.

14. The computer-implemented method of claim 13, wherein the generative model is a generative adversarial network trained to provide the generated content based on the user input data.

15. The computer-implemented method of claim 13, wherein the generated content comprises an image augmented with an icon or a graphic.

16. The computer-implemented method of claim 13, further comprising:

processing the output of the one or more models to generate the data indicative of the generated content for presentation via the display device.

17. The computer-implemented method of claim 13, wherein the data indicative of the generated content comprises an animation based on the generated content, wherein providing the data indicative of the generated content for presentation via the display device positioned on the wheel of the vehicle comprises providing the animation for presentation via the display device such that the animation is presented based on the one or more motion parameters of the vehicle.

18. One or more non-transitory computer-readable media that store instructions that are executable by a control circuit to:

obtain user input data comprising a description of content to be presented via a display device positioned on a wheel of a vehicle;

generate, using one or more models, the content based on the user input data and one or more motion parameters of the vehicle, wherein the one or more models comprise a machine-learned generative model and a physics-based model configured to generate the one or more motion parameters of the vehicle, wherein to generate the content and the one or more motion parameters, the control circuit is configured to:

input the user input data into the machine-learned generative model, wherein the machine-learned generative model is trained based on training data indicative of a plurality of wheel-based features, input the one or more motion parameters into the machine-learned generative model, wherein the machine-learned generative model is trained to process the user input data and provide generated content that is: (i) based on the description of the content included in the user input data, and (ii) configured for presentation via the display device positioned on the wheel of the vehicle based on the one or more motion parameters of the vehicle, receive an output of the one or more models, the output comprising the generated content; and provide, for presentation via the display device positioned on the wheel of the vehicle, data indicative of the generated content.

* * * * *